US012483899B2

(12) United States Patent
McFadden et al.

(10) Patent No.: US 12,483,899 B2
(45) Date of Patent: Nov. 25, 2025

(54) CRITERIA BASED METHOD FOR CELL CHANNEL ALLOCATION BASED ON AUTHORIZATION FROM AN EXTERNAL SYSTEM

(71) Applicant: Telefonaktiebolaget LM Ericsson (publ), Stockholm (SE)

(72) Inventors: Mark McFadden, Mullingar (IE); Premnath Kandhasamy Narayanan, Athlone (IE); Jimmy O'Meara, Athlone (IE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 436 days.

(21) Appl. No.: 16/929,664

(22) Filed: Jul. 15, 2020

(65) Prior Publication Data

US 2021/0022007 A1 Jan. 21, 2021

Related U.S. Application Data

(60) Provisional application No. 62/874,244, filed on Jul. 15, 2019.

(51) Int. Cl.
*H04W 16/14* (2009.01)
*H04W 28/26* (2009.01)

(52) U.S. Cl.
CPC ........... *H04W 16/14* (2013.01); *H04W 28/26* (2013.01)

(58) Field of Classification Search
CPC .............................. H04W 16/14; H04W 28/26
See application file for complete search history.

(56) References Cited

U.S. PATENT DOCUMENTS

| | | | |
|---|---|---|---|
| 2002/0087992 A1* | 7/2002 | Bengeult ............ | H04N 21/4126 725/76 |
| 2007/0218913 A1* | 9/2007 | Chen ..................... | H04W 72/10 455/450 |
| 2011/0319085 A1* | 12/2011 | Ishii ..................... | H04W 88/06 455/436 |
| 2014/0169431 A1* | 6/2014 | Arambepola ....... | H04L 27/0008 375/227 |
| 2017/0208454 A1* | 7/2017 | Knisely ................ | H04W 24/02 |

(Continued)

OTHER PUBLICATIONS

Bernhardt, R. et al., "CBRS Information and Standards from the Wireless Innovation", CBRS Standards by the WInnForum, pp. 1-3, obtained on Jul. 15, 2019, obtained from Internet: https://cbrs.wirelessinnovation.org/.

(Continued)

*Primary Examiner* — Jinsong Hu
*Assistant Examiner* — Farideh Madani
(74) *Attorney, Agent, or Firm* — COATS & BENNETT, PLLC

(57) ABSTRACT

A method for allocating radio channels for use in a wireless cellular network is disclosed. The method comprises receiving from a second system an authorization for the wireless cellular network to use radio channels The method also comprises calculating weights for a plurality of combinations of cells of the wireless cellular network with the radio channels from the second system and assigning at least some of the radio channels to at least some of the cells of the wireless cellular network based on the calculated weights. Apparatus and a computer program product for carrying out the method are also disclosed.

25 Claims, 16 Drawing Sheets

(56) References Cited

U.S. PATENT DOCUMENTS

| | | | | |
|---|---|---|---|---|
| 2017/0280376 A1* | 9/2017 | Nagahama | ............ | H04W 48/06 |
| 2018/0132112 A1* | 5/2018 | Khoshnevisan | .. | H04W 72/0453 |
| 2019/0120969 A1* | 4/2019 | Hamzeh | ................ | H04W 16/14 |
| 2019/0394704 A1* | 12/2019 | Lou | ........................ | H04W 16/14 |
| 2022/0053505 A1* | 2/2022 | Zhao | ................. | H04W 72/0453 |

OTHER PUBLICATIONS

CBRS Alliance, "CBRS Coexistence Technical Specification", CBRSA-TS-2001 V1.0.0, Feb. 1, 2018, pp. 1-20, CBRS Alliance.

Wireless Innovation Forum, "Signaling Protocols and Procedures for Citizens Broadband Radio Service (CBRS)", Document WINNF-TS-0016, Version V1.2.2, Oct. 1, 2018, pp. 1-60, The Software Defined Radio Forum Inc.

Wireless Innovation Forum, "Spectrum Sharing Committee Policy and Procedure Coordinated Periodic Activities Policy", WINNF-SSC-0008-V1.1.0, Jan. 1, 2018, pp. 1-3, The Software Defined Radio Forum Inc.

CBRS Alliance, "Release 1 Technical Webinar", May 30, 2018, pp. 1-30, CBRS Alliance.

3rd Genertion Parntership Project, "LTE; Evolved Universal Terrestrial Radio Access (E-UTRA); User Equipment (UE) radio transmission and reception (3GPP TS 36.101 version 15.3.0 Release 15)", Technical Specification, ETSI TS 136 101 V15.3.0, Oct. 1, 2018, pp. 1-1698, ETSI.

Mun, K., "OnGo New Shared Spectrum Enables Flexible Indoor and Outdoor Mobile Solutions and New Business Models", OnGo White Paper, Mar. 1, 2017, pp. 1-9, Mobile Experts, Inc.

Pucker, L. et al., "Webinar #21: CBRS Baseline Standards", Wireless Innovation Forum Webinar Series, Feb. 22, 2018, pp. 1-69, Software Defined Radio Forum, Inc.

* cited by examiner

| ITERATION | CELL A ALLOCATION | CELL B ALLOCATION | WEIGHT | INFO |
|---|---|---|---|---|
| 1 | 1 | 2 | 520 | 2 non FSS Channels = (2x250) + (2x10) |
| 2 | 1 | 2,3 | 780 | |
| 3 | 1 | 2,3,4 | 1040 | |
| 4 | 1 | 2,3,4,5 | 1300 | |
| 5 | 1 | 3 | 520 | |
| 6 | 1 | 3,4 | 780 | |
| 7 | 1 | 3,4,5 | 1040 | |
| 8 | 1 | 3,4,5,6 | 1300 | |
| 9 | 1 | 4 | 520 | |
| . | . | . | . | |
| 110 | 1 | 30 | 510 | 1 FSS Channel with 1 non FSS Channel Consider Cell A only without B |
| 111 | 1 | | | |
| 112 | 1,2 | 3 | 780 | |
| 113 | 1,2 | 3,4 | 1040 | |
| 114 | 1,2 | 3,4,5 | 1300 | |
| 115 | 1,2 | 3,4,5,6 | 1560 | |
| 116 | 1,2 | 4 | 780 | |
| . | . | . | . | |
| 419 | 1,2,3,4 | 30 | 1290 | Consider Cell A only without B |
| 420 | 1,2,3,4 | | | |
| 421 | 2 | 3 | | |
| . | . | . | . | |
| 733 | 2,3,4,5 | 6,7,8,9 | 2080 | 8 non FSS Channels, 2 per cell = (4x250) + (4x10) |
| 734 | 2,3,4,5 | 7 | | |
| . | . | . | . | |

FIG. 4

CRITERIA BASED METHOD FOR CELL CHANNEL ALLOCATION BASED ON AUTHORIZATION FROM AN EXTERNAL SYSTEM

RELATED APPLICATIONS

The present application is claims benefit of U.S. Provisional Application 62/874,244 which was filed Jul. 15, 2019, the disclosure of which is incorporated herein by reference in their entirety.

TECHNICAL FIELD

The present invention relates to wireless cellular networks, in general, and in particular to methods and apparatus for allocating radio channels for use in a wireless cellular network.

BACKGROUND

In the USA, the 3.6 GHz (3550 MHz to 3700 MHz) band is already in use prior incumbents (e.g., US Federal Government for Naval radar systems and Department of Defence or existing license holders) but may be used by others (e.g., telecom operators) where and when not needed by the US government. The Citizen's Broadband Radio Service (CBRS) is an initiative that aims to allow this part of the spectrum to be shared. Telecom operators might be able to deploy 4G and 5G wireless networks using the CBRS.

This is done using a component called a Spectrum Access System (SAS) which allocates frequencies and transmission power to individual Citizens Broadband radio Service Devices (CBSDs) using measurements and interference modelling calculations. The CBSDs request permission to transmit, and grants are assigned to each CBSD giving frequency and transmission power. These grants are polled to check whether they are authorized to transmit and this polling (called heartbeating) gives authorization to transmit for a few minutes with each heartbeat. This mechanism is described in more detail in reference [1].

The SAS is the key component that allows the spectrum of the 3.6 GHz band to be shared, but SASs are provided by multiple vendors and the vendors must synchronize their SASs to allow interference modelling to occur between vendors' equipment. This is done using so called Cooperative Periodic Activity between SASs (CPAS) described in [2]. Before CPAS is complete the CBSD will get a grant but the grant will not be authorized until the CPAS process has confirmed the grant with the neighbouring SASs.

The highest priority is assigned to incumbents, who have primary status in the band. Secondary access to this band is requested by a Citizens Broadband radio Service Device (CBSD) or Domain Proxy from a Spectrum Access System (SAS), which is a geolocation database and policy management service. The SAS controls channel authorization, limits Effective Isotropic Radiated Power (EIRP) for each authorized channel in the units of dBm/MHz, and prioritizes access to channels for CBSDs or Domain Proxies with the higher priority being accorded to Priority Access Licensees, followed by General Authorized Access. All mobile broadband use is coordinated by the SAS with decisions informed by knowledge of incumbent activity near deployed CBSDs.

In the United States the Citizens Broadband Radio Service (CBRS) is a 150 MHz wide broadcast band of the 3.5 GHz band (3550 MHz to 3700 MHz). The spectrum is in use by existing incumbents (Radar systems, Fixed Satellite Systems and Wireless Internet Service Providers). Citizens Broadband Radio Service Devices (CBSDs) operating in this band are required to seek authorization to use channels in this band and comply with requirements specifying the maximum power for the channels from a Spectrum Access System (SAS).

The SAS prioritizes incumbents and coordinates mobile broadband use by Priority Access License (PAL) licensees and then General Authorized Access in three tiers of a spectrum sharing hierarchy as illustrated in FIG. 1. PALs are associated with 10 MHz of spectrum per county, without consequent guarantees on actual spectrum availability or power assignment for granted spectrum. In the presence of dynamic spectrum activity by naval radar, the SAS may suspend or terminate channels and the CBSD or Domain Proxy may then request alternative channels and move operating frequency to newly authorized channels of suitable bandwidth.

FIG. 2A illustrates Winnforum reference architecture for CBRS deployments. We may also refer to a simplified FIG. 2B, which illustrates interface for communication between a SAS and CBSD devices or Domain Proxies (DP) which represent which represent one or more CBSD devices to the SAS as described in reference [1]. SAS is a system that authorises and manages use of the CBRS spectrum by the CBSD devices. A CBSD device is a radio device which transmits and receives wireless communication in the CBRS band. It may be, for example, a radio base station (e.g., eNodeB or gNodeB) of a wireless network operator capable of operating in the spectrum assigned to this network operator as well as in the CBRS band when authorised by the SAS.

There is therefore a need for a system which will assign the authorized channels efficiently to the cells of the CBSD's based on multiple criteria such as the Instantaneous Bandwidth (IBW) or Occupied Bandwidth (OBW) capabilities of the device, desired power, dynamic range of power adjustment possible, minimal acceptable power reduction for coverage, number of cells, band capabilities of the radio transmission device, the ability of the device to operate on contiguous or non-contiguous channels, prioritization of mobility over throughput, or other emerging use cases such as preferred latency for mission critical applications and use cases corresponding to massive IoT where power savings are important.

There currently exist certain challenge(s). The existing solutions allocate frequency, channel bandwidth and power based on a) manual derivation of coverage footprint b) drive test (to verify coverage). The existing solutions do not consider dynamic allocation of channels and in certain implementations do not consider the maximum transmission power for the channels in the CBRS band as required by the external system.

SUMMARY

According to a first aspect of the present invention there is provided a method for allocating radio channels for use in a wireless cellular network. The method comprises receiving from a second system an authorization for the wireless cellular network to use radio channels. The method also comprises calculating weights for a plurality of combinations of cells of the wireless cellular network with the radio channels from the second system and assigning at least some of the radio channels to at least some of the cells of the wireless cellular network based on the calculated weights.

According to a second aspect of the present invention there is provided an apparatus for allocating radio channels for use in a wireless cellular network. The apparatus comprises a processing circuitry and a memory. The memory contains instructions executable by the processing circuitry such that the apparatus is operative to receive from a second system an authorization for the wireless cellular network to use radio channels. The apparatus is also operative to calculate weights for a plurality of combinations of cells of the wireless cellular network with the radio channels from the second system and to assign at least some of the radio channels to at least some of the cells of the wireless cellular network based on the calculated weights.

According to a third aspect of the present invention there is provided a computer program product comprising instructions which, when executed on at least one processor, cause the at least one processor to carry out a method disclosed in this document.

Further features of the present invention areas claimed in the dependent claims.

Certain embodiments of the disclosed solution may provide one or more of the following technical advantages.
- Effective channel allocation for multiple CBSD device types based on their capabilities, RAN configuration and configurable prioritizable criteria.
- Support for multiple radio types, where IBW/OBW of the device is less than the band (i.e. the band for CBRS channels in 3550 MHz to 3700 MHz part of the spectrum), where the IBW supports the full band but OBW is lower or where IBW/OBW supports the full band. Also, devices with multiple radios are supported.
- The disclosed solution provides a mechanism supporting dynamic channel allocation initially for the CBSDs and later, when grants are suspended or terminated, for a CBSD reassigning new authorized grants to cells based on the device capabilities.
- The disclosed solution provides a mechanism enabling prioritizing mobility/coverage over capacity and vice versa.
- The disclosed solution mitigates ineffective channel allocation that leads to underutilization of channels. And also vice versa, i.e. it mitigates underutilization of channels that leads to ineffective channel allocation.

BRIEF DESCRIPTION OF THE DRAWINGS

The present invention will be understood and appreciated more fully from the following detailed description taken in conjunction with the drawings in which:

FIG. 4 shows channels allocated to cells A and B and their corresponding weight;

DETAILED DESCRIPTION

Figure 1:
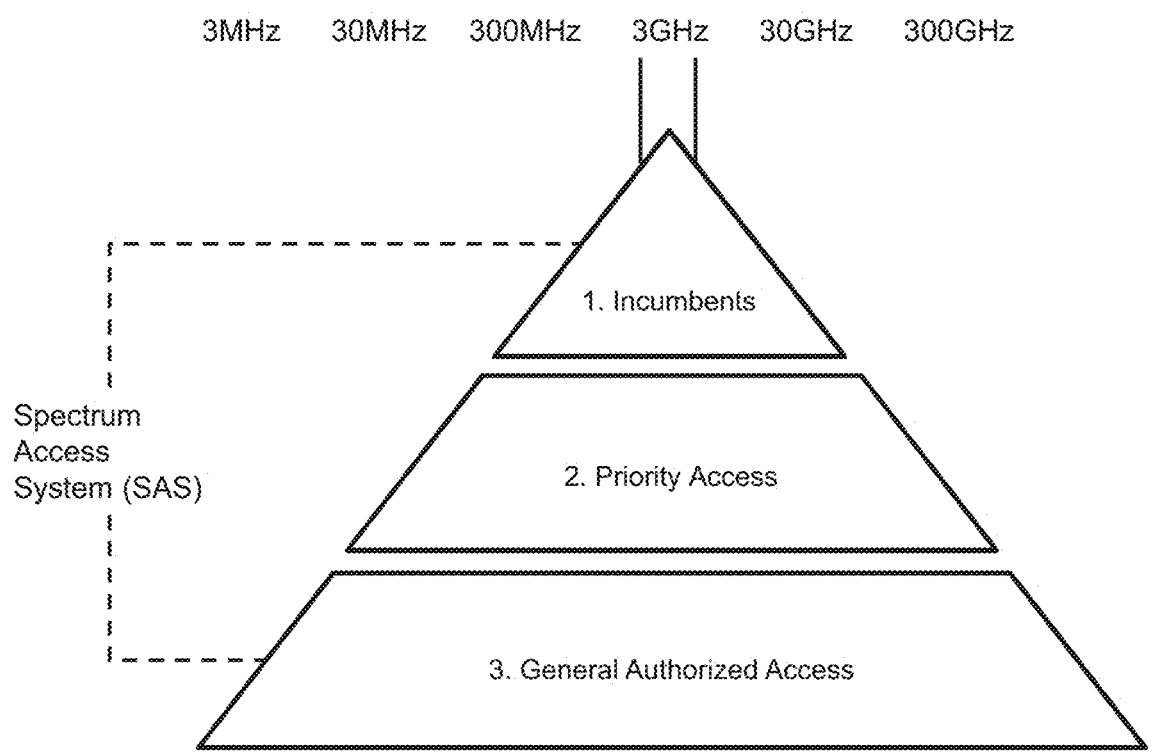
FIG. 1 is a diagram illustrating principles of spectrum sharing hierarchy in Citizens Broadband Radio Service.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Certain aspects of the present disclosure and their embodiments may provide solutions to the challenges described in the background section. Embodiments of the solution disclosed in this document provide an apparatus and method to assign authorized channels from an external system to radio devices based on at least one of several criteria such as:
- maximizing the bandwidth used by the device based on the available channels;
- minimizing power reduction of cells of the transmission device based on available channels and maximum transmission power per channel;
- the minimum channel size supported by the transmission device;
- the maximum Instantaneous Bandwidth (IBW)/Operational Bandwidth (OBW) which the transmission device supports;

the number of cells/carriers associated with the transmission device;

whether the transmission devices support contiguous channels only or supports non-contiguous;

prioritizing use of channels based on incumbents and location of the transmission device (e.g., prioritizing non-radar channels for CBSDs located in coastal areas reducing the need to move channels due to radar);

the maximum channel bandwidth of the cells of the transmission device;

the minimum frequency of the available channels;

maximum frequency of the available channels;

right numerology (5G sub-carrier spacing) for right latency based on services used;

minimizing frequency usage across the network;

for mobility, minimizing subscriber impact, e.g., for use cases where channels are suspended continue transmission on 1 cell while moving frequency of other cells ensuring all cells have one or more channels allocated;

... and many other criteria.

In some embodiments, the apparatus and method assign maximum allowed transmission power for those channels based on at least one of the above criteria.

In embodiments of the method and the apparatus the criteria may be prioritised.

1) Effective channel allocation and power method for CBRS that helps to allocate channels, power effectively to CBSD devices beyond traditional simple allocations.

2) The method described in this document can be implemented in any system (e.g., SAS) that authorizes channels and transmission power (Tx power). In particular, in a system for allocating channels for an unlicensed spectrum in high band (>6 GHz) (such system may additionally consider latency need of the devices for CBRS-like use-cases.)

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

This disclosure provides a method for selecting the most effective (based on multiple criteria) channel units (authorized by an external system such as SAS or available based on measuring channel units), and optionally maximum power per channel (required for CBRS band) to multiple cells/carriers. This disclosure also provides an apparatus for implementing said method. In a preferred embodiment this is applicable to General Authorized Access grants, which is the bottom tier illustrated in FIG. 1 and described earlier. For PAL channels where the channel size is 10 MHz these are represented internally as 2×5 MHz channel units and specific steps taken when required to ensure the full PAL channel is assigned to only one cell.

In a preferred embodiment CBSD is a small cell solution (standalone device), for which micro-radios are used, for example in Ericsson's Radio Dot form.

In a preferred embodiment these devices are connected to the baseband unit and have their own cells defined in the baseband unit.

In an alternative embodiment the CBSD device may be implemented as part of an eNB/gNB but transmitting in CBRS part of the spectrum.

In the following description the following values characterizing the CBRS band will be used:

N—is indicative of the maximum cell bandwidth as it encodes the number of channel units, e.g., 20 MHz is 4×5 MHz (i.e. 4 channel units); CBRS for LTE and NR supports aggregating adjacent 5 MHz channel units into a single 10, 15 or 20 MHz channel for use by a single radio.

M—represents the highest authorized channel unit in the band (in CBRS there are 30 channel units of 5 MHz, therefore if the maximum channel unit is authorized M will be 30). An important point to note is that in CBRS the PAL channels (second tier in FIG. 1) are 10 MHz and aligned with a 10 MHz raster. In the case of PAL channels, 2×5 MHz raster's can be used in channel allocations to cells and if necessary, results can be filtered where only the full 10 MHz is assigned to only 1 cell.

In Summary:

1. For a CBSD device (i.e. a base station operating in the CBRS spectrum) with one cell on the Radio Access Network, the method iterates over the channel units in the band (i.e. the CBRS channel units in 3550 MHz to 3700 MHz part of the spectrum). In one embodiment the iteration may be from 1 to M, i.e. over all CBRS channel units and in an alternative embodiment the method iterates from the first available/authorized lowest frequency channel unit to the last available/authorized highest frequency channel unit. In the embodiment in which the method iterates over all channel units 1-30, the method allocates channel units from current channel unit to current channel unit+N−1 to a cell, filters out unsupported combinations (i.e. combination with CBRS channels which are not authorized for use by the wireless cellular network) and assign a weight based on desired priorities per allocation of channel units to the cell.

For each additional cell iterate over the remaining channel units from the lowest channel unit not yet assigned to any cell to the highest available/authorized channel unit in the band and per iteration of the previous cell assigning channel units from 1 to N at each iteration between 1 and N to the current cell and along with the existing channel allocations of previous cells. Then the method may include filtering based on unsupported combinations of channel units to cells and assigning a weight per overall cell/channel unit combination based on desired prioritization.

The outcome of this process will be a list of channel units provisionally assigned to cells with their corresponding weights based on the assignments to the cells.

2. Sort the channel units' provisional assignments to cells based on highest weighting to lowest weighting 3. If multiple channel unit provisional assignments to cells exist with the same highest weight value then apply additional weighting calculation based on desired prioritization for this case.

4. The highest weighted channel unit provisional assignments to cells (if no further processing is required) will be frequencies and channel bandwidth which should be assigned to the cells and applied in RAN for use in providing services in the network.

The term "weight" refers to a numerical expression indicative of performance, efficiency or effectiveness of the combinations of assignments of channel units to cells, relative to their alternatives (similar to the term "figure of merit").

The method is particularly applicable to CBRS channel units, but in alternative embodiments it may be applied also to any band where the channels wouldn't be known in advance, e.g., alisten before talk device.

In some embodiments the method uses the following input data:
- Capabilities of the CBSD/radio transmitter, IBW, OBW, min/max frequency, number of radios, LTE/NR radio transmitter, limitations, e.g., due to possible non-certifications of certain cell channel bandwidth combinations.
- Cell(s) and their current state/configuration (current frequency, channel bandwidth, transmission state, current configured power, desired power for coverage).
- Priorities for weighting calculation and any other data which will improve the weighting calculation, e.g., location and proximity to Fixed Satellite System and corresponding channels of those, and WISP (wireless internet service providers) locations and channels they use, etc. One or more processing functions can be applied on a per-priority-basis, e.g., apply weight of 100 per channel based on number of current channel allocations to cell(s) or decrease total weighting based on power reduction required by external system per channel.
- Measurement of the radio frequency energy received over a set of frequency ranges in the band during a measurement interval can be used as input for prioritizing the usage of channel units not in use by nearby radio transmission devices.

RAN configuration of one cell for a CBSD:
Stage 1:
Calculate all possible combinations of channel units in the band to cell(s) and a corresponding weight (if not filtered) starting from the first lowest frequency of available channel units to the highest frequency of available channel units and based on technology/radio limitations and contiguous channels per cell, remove combinations of channel units to cells where all channel units are not available from the external system and weight the result based on required prioritizations, storing all weights/cell and channel unit combinations to cells for
Stage 2.

In a preferred embodiment the term "band" here refers to the collection of 5 MHz channel units in the CBRS part of the spectrum. There are 30 channel units of 5 MHz and the SAS may authorize only a subset of these 30 channel units for use by the wireless cellular network. The SAS may authorize any of the possible combinations of channel units. In preferred embodiments the method operates in contiguous blocks of channel units supported by the cells and filter out any result where channels allocated to the cells are not authorized by the external system. In a preferred embodiment only contiguous blocks of channel units are of interest because in LTE and NR only adjacent channel units can be aggregated into a single 10, 15 or 20 MHz channels.

For CBRS, combinations of 5 MHz channel units are used, e.g., performing Spectrum Inquiry to request channel size of 10 MHz would be 2×5 MHz channel units and subsequently Grant Requests based on available channels in Spectrum Inquiry result with channel sizes of 10 MHz. In that case authorization in Heartbeat Response of 10 MHz channels will be converted to 2×5 MHz channel units and if configured filtering any combinations where an authorized 10 MHz may be split across 2 cells. In the future for CBRS and with co-existence algorithm the channels available to CBSDs may be limited.

1. Loop over the band channel units from 1 to M with current channel unit as cA.
2. For contiguous channel units for the Cell A, for each cA loop number of channel units X from cA to cA+N−1 for Cell A and where X<=M. Here, from all the possible combination of channel units we select all possible combinations of contiguous channel units. We select cA and then loop X number of contiguous channel units from a range cA to cA+N−1, where X<=M. For simplicity, if we have authorized channels 10, 11, 12, 13, 14, 18, 19 and 20 then we iterate in the range 10-14 (as channel 18 is not contiguous with channel 14). For cA=10 we have the following combinations:
    10, 11
    10, 11, 12
    10, 11, 12, 13
    10, 11, 12, 13, 14
    Then we take cA=11 and we have:
    11
    11, 12
    11, 12, 13
    11, 12, 13, 14
    . . . etc.
    We do the same also for the second range of contiguous channels 18, 19 and 20.
    However, some contiguous channel units may not be authorized and then step 4 filters out any channels used in the iteration but not authorized by the SAS, and for those cases no weight is generated for the cell/channel combination.
3. For each X we provisionally assign contiguous channel units from cA to X to cell A.
4. For each X, and only for cases where all channel units assigned to A are authorized by the external system, process weighting for allocations of channel units to Cell A for the iteration. Now it's time to calculate weights for all the combinations of contiguous channels. Calculation can be done based on the various criteria that may have different priorities depending on the operator's need. In the end each of these combinations will have a certain weight. See Weighting Calculation.

For cases where the radio may not support the channel unit to cell allocation (e.g., contiguous channel units only or IBW being less than the band) then remove these from further calculation otherwise store the cell channel unit allocations and weighting value.
Stage 2:
Selection of Best Channel Assignments to Cell(s)
After all possible combinations of available/authorized channel units to the cell(s) are weighted (i.e. weights are calculated), sort the combinations from highest to lowest weighting.

1. Filter weightings:
    For situations where the device is not capable of supporting the channel allocation to the cell (possibly the device does not support the full band or the bandwidth etc.), or for undesirable cell and channel allocations these weightings should be filtered out and removed from any further calculation.
2. Selection of determined best channel units allocated to cells:
    For all remaining combinations where the highest weighting is equal, apply additional weighting to select the most desirable outcome of channel unit allocations to cell(s)

The highest weighted channel units to cell(s) assignment is the best determined assignment based on the selected weighting prioritization and these channel units will be assigned to the cells and applied in RAN for use in providing services in the network.

RAN Configuration of Two Cells for a CBSD:

When calculating weightings for two cells, as the band from 1 to M is iterated over for cell A, all combinations (and therefore weights) are calculated for Cell B based on remaining channel units in the band up to M not assigned to cell A and with each calculation for B being performed relative to the current channel unit allocations of Cell A (i.e. A gets channel 1, B gets channel 2. A gets channel 1, B gets channel 2,3, etc. until the end of the band).

Stage 1:

Calculate all possible combinations of externally available/authorized channel units to cells based on technology/radio limitations and weight the result based on defined prioritizations The description below is based on the same concept as the one for RAN configuration of 1 Cell for a CBSD described earlier:

1. Loop over the band channel units from 1 to M with current channel as cA.
2. For contiguous channel units for the Cell A, for each cA loop number of channel units X from cA to cA+N−1 for Cell A and where X<=M
3. For each X assign contiguous channel units from cA to X to cell A
4. For each X Loop over remaining channel units to the highest authorized/available channel M, i.e. from channel unit X+1 to M for Cell B where the current channel unit is represented as cB
5. For each cB and for contiguous channel units for Cell B, loop number of channel units Y from cB to cB+N−1 and where Y<=M
6. For each Y assign contiguous channel units from cB to Y to Cell B
7. For each Y and only for cases where all channel units assigned to cells A and B are authorized by the external system e.g., SAS, process weighting for allocations of channels to Cell A and B for the iteration. In step 7 In this step, combinations of unauthorized channels are filtered out. See Weighting Calculation.

For cases where the radio may not support the cell channel unit allocations (e.g., contiguous channel units only or IBW being less than the band) or for carrier channel bandwidths which are not supported by the 3GGP standard for nominal channel spacing see reference [3] "3GPP TS 36.101 version 15.3.0 Release 15 Table 5.6A.1-1: E-UTRA CA configurations and bandwidth combination sets defined for intra-band contiguous CA", then remove these from further calculation otherwise store the cells channel assignments and weighting value.
8. For each X process only assignment of channels to cell A and only where all channels assigned to cell A are authorized by the external system process weighting for assignments of channels to Cell A iteration. See Weighting Calculation.

For cases where the radio may not support the cell channel assignments (e.g., contiguous channels only or IBW being less than the band) or for carrier channel bandwidth which are not supported by the 3GGP standard for nominal channel spacing see reference [3]"3GPP TS 36.101 version 15.3.0 Release 15 Table 5.6A.1-1: E-UTRA CA configurations and bandwidth combination sets defined for intra-band contiguous CA", then remove these from further calculation otherwise store the cells channel assignments and weighting value.

Figure 3:
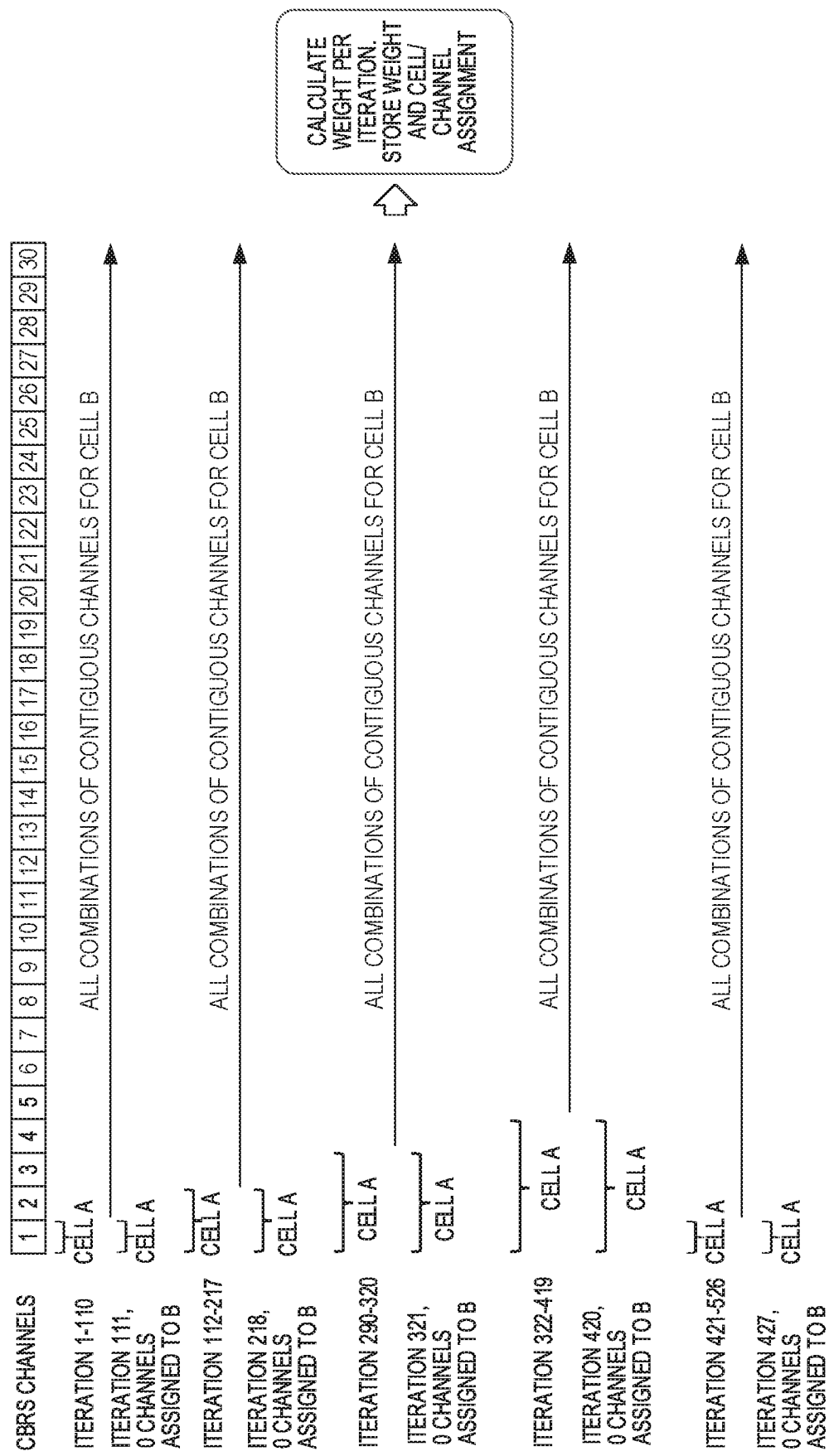
FIG. 3 shows the initial iteration process for both cells A and B in one embodiment.
Figure 5:
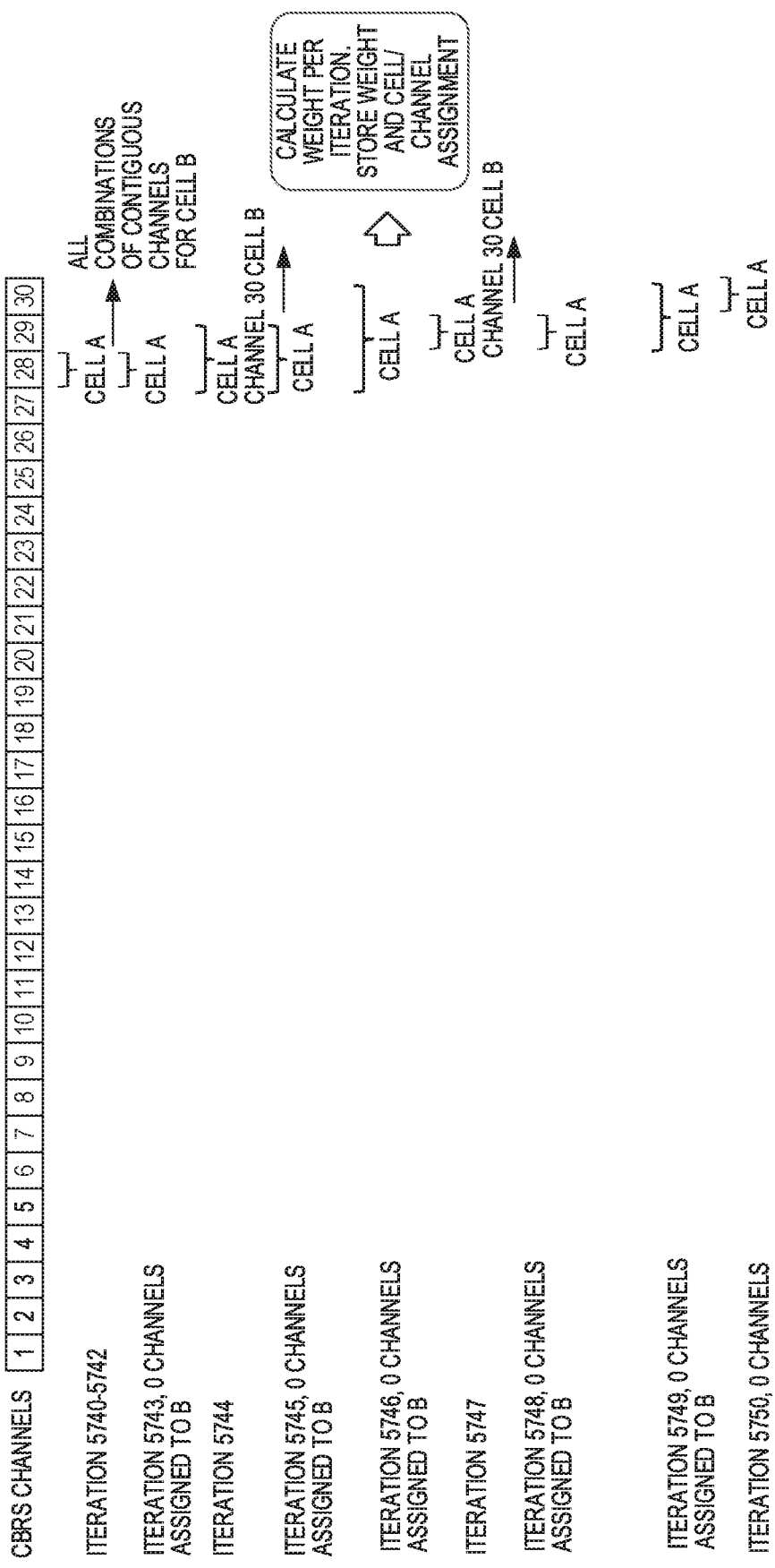
FIG. 5 shows last iterations of channel unit to cell allocations for two LTE Cells (cells A and B) for CBRS band.

FIG. 3 is an illustration showing the initial iteration process for both cells A and B. FIG. 4 shows the actual channels allocated to cells A and B and the corresponding weight. The table in FIG. 4 illustrates iteration samples, cell/channel unit allocations and corresponding weight for two LTE cells, prioritizing number of channel units per cell (weight per channel=250) and use of non FSS channel units (weight per non FSS channel=10). FIG. 5, in turn, shows last iterations of channel unit to Cell allocations for two LTE cells (cells A and B) for CBRS band.

Stage 2:

The operations of Stage 2 for RAN configuration of two Cells for a CBSD are performed in a preferred embodiment the same ways as for Stage 2 for one cell described earlier.

Figure 6:
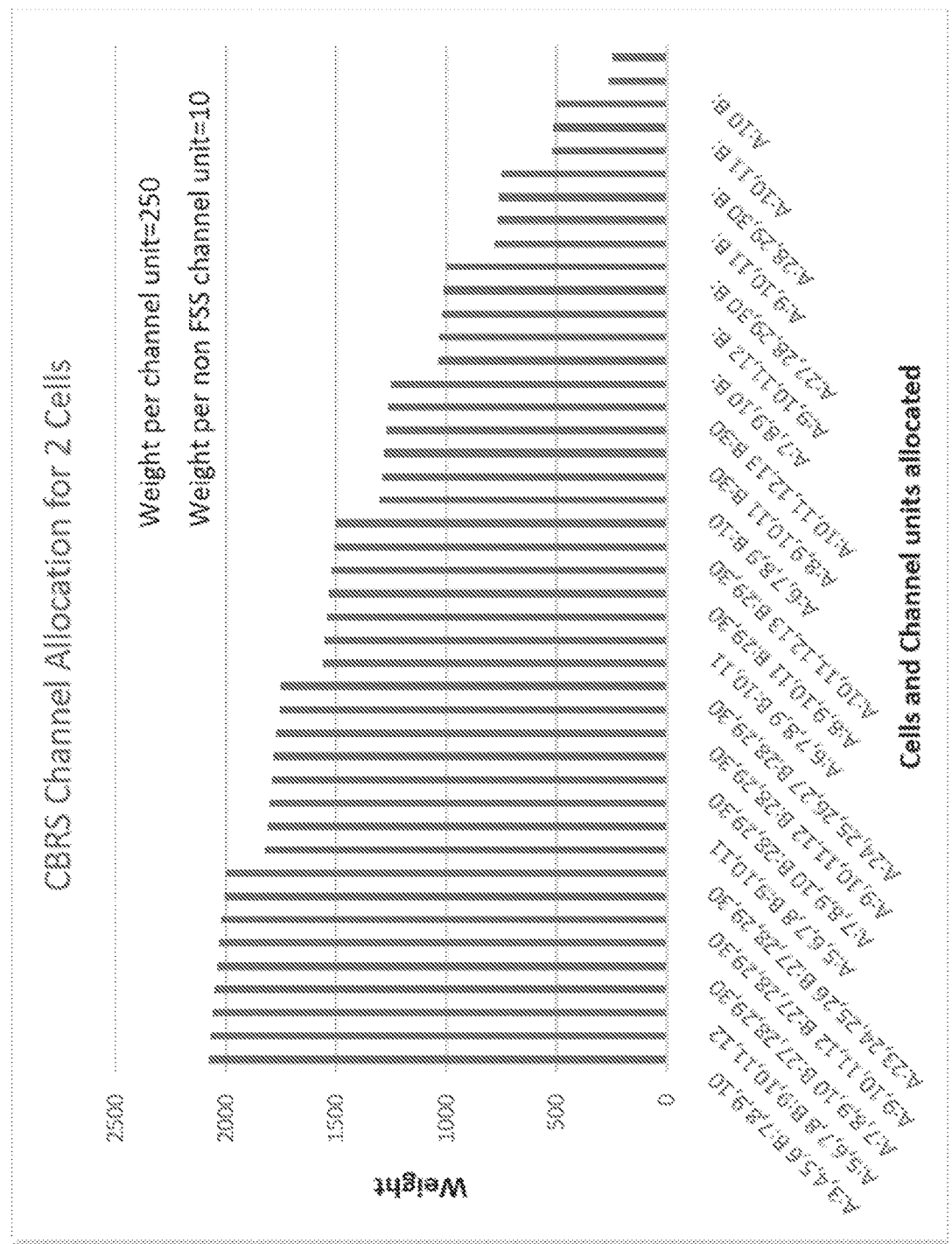
FIG. 6 sample output of cells and channels combinations for two LTE cells operating in CBRS band.

FIG. 6 illustrates sample output for two LTE cells operating in CBRS band where all channel units are available from the external system (e.g., SAS). Duplicate weightings are removed for illustrative purposes. In this example the priority is maximizing bandwidth across the cells with the secondary priority being the use of channel units not used by Fixed Satellite Systems. The selection outcome (based on the diagram with duplicate weights removed) will be for weight of 2080, with Cell A assigned channel units 3,4,5,6 and Cell B assigned channel units 7,8,9,10.

RAN Configuration for and CBSD Supporting>Two Cells:

Stage 1:

The same method applies here as when supporting two cells. A loop exists per cell from highest channel unit assigned to previous cell+1 (or 1 if no cells processed previously and therefore no channel units assigned previously) represented as X to the last channel unit authorized/allocated in the band.

Each cell is iterated on relative to the current iteration of the previous cell. Per iteration per cell, contiguous channel units are assigned from X to X+max channel units supported for the cell (4×5 MHz for LTE). Per iteration of current Cell, all channel units allocated to current Cell and all previous cells are captured and weighted.

Stage 2:

Same as Stage 2 for RAN configuration of one cell for a CBSD described earlier.

Weighting Calculation:

The weighting is calculated based on required priority, the higher the priority the higher the weight value should be. The highest weighted allocation of contiguous channel units to cells will be chosen as the outcome to assign these channel units the cells and apply in RAN for use in providing services in the network (if no further processing is required). For example, for base 10 and to strictly enforce prioritization with 3 priorities the weight assignment would be that the max value for priority 3<min value for priority 2 and the max value for priority 2<min value of priority 1.

In some embodiments, for undesirable outcomes of cell/channel unit allocations negative weights can be applied, e.g., for reduction of cell power could negatively affect the total weighting, if total power reduced by 25% then weighting can be reduced by 25% thereby prioritizing channel units where authorized power>current RAN power for the cell.

Weights may be assigned based on multiple and optional factors with the weighting reflecting the priority:

A. Number of channel units assigned.
B. Existing frequencies in use which prioritizes mobility and not impacting subscribers and reduces network frequency use.

C. Use of certain channel units over others, for CBRS and based on CBSD location for example prioritizing non-radar channels or enforcing mandatory use of PAL channels.
D. Configured power on RAN (for full coverage) versus authorized power from external system (SAS for CBRS).
E. Current channel units in use on the cell prioritizing mobility.
F. Minimizing frequency usage across the network.
G. Minimizing interference with neighbouring cells in the same network or other networks if data is available.
H. Channel unit assignment based on nominal channel spacing required for Carrier Aggregation, see reference [3] 3GPP TS 36.101 version 15.3.0 Release 15 Table 5.6A.1-1: E-UTRA CA configurations and bandwidth combination sets defined for intra-band contiguous CA.
I. Each cell having 1 or more channel units assigned
. . . and many other factors.

The weighting calculation also includes a processing function, e.g., to prioritize number of channel units used a weight per channel unit of 10 could be assigned and for LTE and 2 cells if all channel units are available then the maximum weight will be 80.

Weighting Example with 2 Levels of Prioritization:

An example of prioritizing the channel units and therefore bandwidth assigned to cells is shown in FIG. 6 whereby the first priority is the channel units assigned to the cells and therefore having a weighting per channel of 250 with the second priority being prioritizing the use of non-Fixed Satellite System channel units where the weight per non FSS channel is 10.

Weighting Example with 3 Levels of Prioritization, a Subset of Authorized Channel Units with Various Authorized Power Levels as a Percentage Per Channel Unit:

The following is an example of the result from the method for a device with an OBW of 40 MHz, and IBW of 150 MHz where based on the authorized channels and authorized power as a percentage of potential maximum power based on the table 1 below. Note: the power is converted as a percentage and scales linearly for illustrative purposes, but the desired result may be to weight severally against very low power values.

TABLE 1

Table of authorized/available channel units from an external system and the percentage of power per channel unit based on maximum potential power for weighting example.

| Authorized Channel | Authorized power as percentage of max available power |
|---|---|
| 1 | 100 |
| 2 | 100 |
| 6 | 75 |
| 7 | 100 |
| 8 | 100 |
| 9 | 100 |
| 10 | 100 |
| 15 | 100 |
| 19 | 100 |
| 20 | 100 |
| 21 | 100 |
| 22 | 75 |
| 23 | 50 |
| 27 | 100 |
| 28 | 100 |
| 29 | 100 |

Based on the available channels and percentage of power available per channel and weighing as in Table 2 below weights for combinations of cells may be calculated.

TABLE 2

Priorities and weights assigned per priority for weighting example.

| Priority (high to low) | Information | Weight |
|---|---|---|
| 1 | Weight per channel assigned to Cell(s) | 1000 per channel |
| 2 | Weight for 100% power, reduced per power percentage available per channel unit grant | 100 per channel |
| 3 | Weight per non FSS channel unit | 10 |

Figure 7:
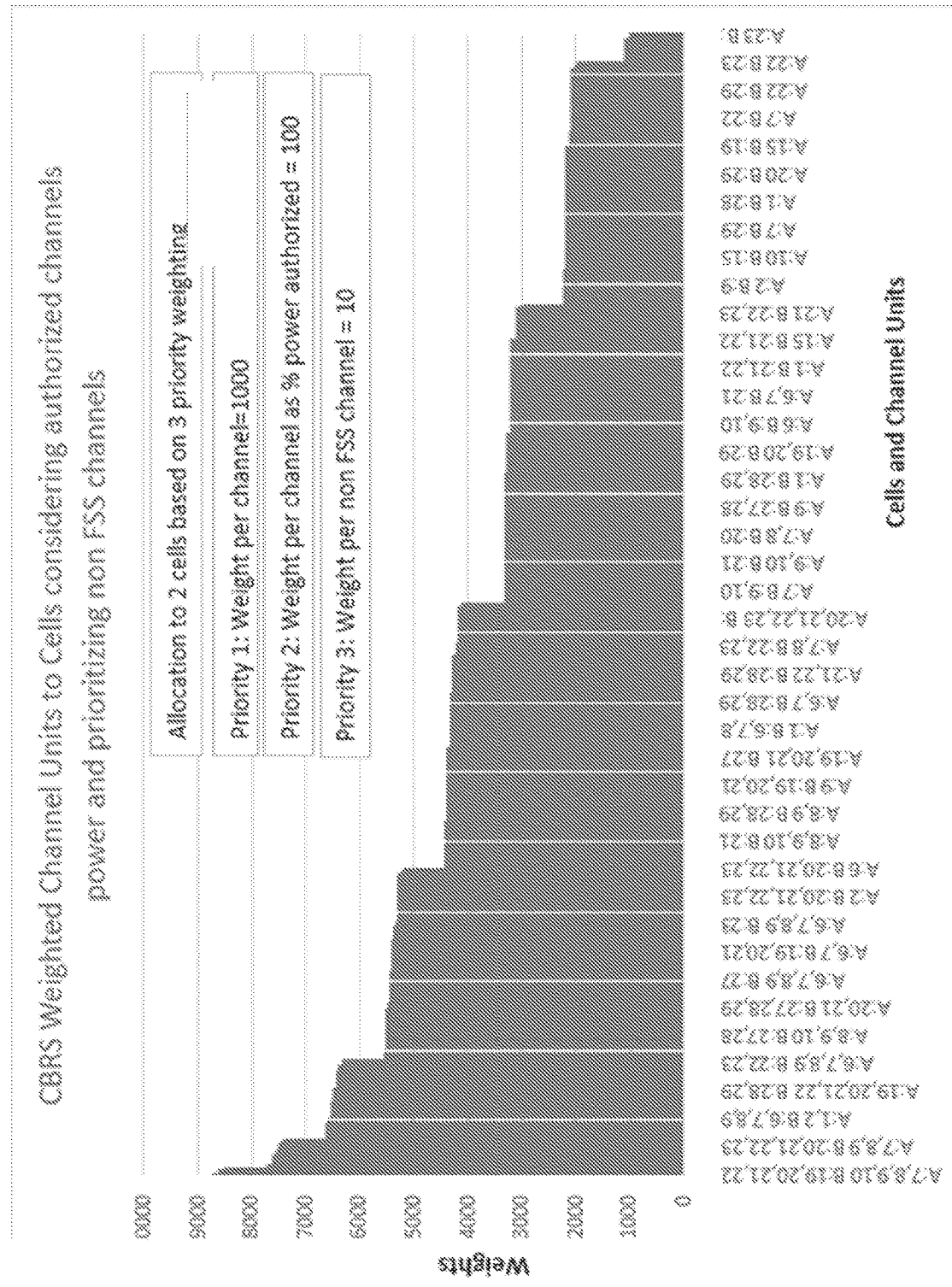
FIG. 7 shows result of weighting example based on maximum of 4 LTE channel units per cell.

FIG. 7 shows result of weighting example based on LTE maximum of 4 channel units per cell, subset of available/authorized channel units within the CBRS band, power as a % of potential maximum power available per channel unit and weighting based on 3 priorities from high to low of
Priority 1—channel units allocated to cells
Priority 2—power reduction
Priority 3—use of non FSS channel units in allocations to cells.

From this example, Cell A would be assigned channels 7, 8, 9, 10 and Cell B would be assigned channels 19, 20, 21, 22, this is chosen with a weight of 8740 because it is 8×1000 for the channel units allocated to the 2 cells+4×10 for non FSS channels of 7, 8, 9, 10 allocated to cell A+power for channel unit 7, 8, 9, 10 of 100 each+power for channel units of 19, 20, 21, 22 being 100, 100, 100, 75=8815

Cells with Different Planned/Optimal Power Configurations:

The method for two cells applies weights of all cell B combinations relative to cell A iterating from the first lowest channel authorized/allocated to the highest channel authorized/allocated in the band. For cells where the desired power configuration (based on desired coverage etc.) is different per cell then the method should be applied several times, e.g., for combination of two cells where the real cell names are cell1 and cell 2, weightings should be calculated where Cell1=A and Cell2=B and additionally Cell2=A and Cell1=B, the weighting result of both being sorted and the top weighting from both being chosen as the cell/channel unit assignment which should be applied to the cells.

CBSDs with Multiple Radios where Channels Assigned Per Radio Must not Overlap:

For multiple radios where frequencies must not overlap the method can be applied per radio, filtering overlapping channel unit allocations to cells, e.g., for two radios, perform method for radio 1, then the radio 2, for each weighted result of radio 1 combine with all weighted results of radio 2 filtering overlapping channel units between the radios. For weighting the outcome for example, a summation of the weights for both radios can be used.

Weighted Profiles

In one embodiment, to provide a systematic approach for weighting calculation, prioritization and to allow user configuration, weighted profiles may be used.

The weighting calculation is performed for each cells and channels combination and is based on a preconfigured and user-defined profile for the CBSD. The profile consists of one or more configurable pre-programmed profile elements where the order of the elements within the profile determines the priority. Each profile element evaluates a particular assignment of authorized aggregated channel(s) and power to the cells and returns a fixed value e.g., −1 to 100 (where value −1 indicates invalid assignment). Based on the location of the profile element within the profile and therefore the priority, this returned value is indicative of the priority.

Profile elements within the profile may also be validators in which case they do not return a value which is indicative of the priority but rather determine if the particular assignment of authorized aggregated channel(s) to cells is valid or not (if the assignment is invalid it should be ignored); for example, a profile element validator called "InvalidatePAL-AndGAAOnCell" will invalidate combinations of GAA (General Authorized Access) and PAL (Priority Access License) authorized grants being assigned to the same cell, and valid combinations are those where a cell for that CBSD only has one or more PAL channels assigned where other cells for that CBSD may have only GMA channels assigned. Several examples of profile elements are listed in Table 3.

being the use of channels 1-4 on the Cells. A validator may also be configured to ensure only authorized grants with maxEirp>10.0 will be assigned to the cells. The profile priority value must be unique. In one embodiment, the profile may be a template without configured values and later that template be used on multiple CBSDs but with individual configuration per CBSD.

Optimizations:

For descriptive purposes it is described here to use one loop per cell/carrier and a loop per contiguous channels per cell. Rather than having loops per cell it is more generic to use recursion.

For radios which support a lower IBW than the band, e.g., for 2 cells and a radio only supporting an IBW/OBW of 40 MHz stop iterating after the first iteration for Cell B where

TABLE 3

Profile Elements

| Profile Element Name | Type | Description | Example Formula (Range 1-100) |
|---|---|---|---|
| Maximize Bandwidth | Weighted | Maximizes the total number of channels assigned to the cells of a CBSD | (total Bandwidth Assigned to Cells / (Min (max number of channels for cells of CBSD or OBW capability of CBSD))) /100 |
| Maximize Power | Weighted | Maximizes the power of the cell based on maxEirp's of aggregated channels assigned to cells | (Sum of lowest maxEirp assigned per cell / (37.0 * Number of Cells of CBSD ) / 100 |
| Prioritize Channels | Weighted | Prioritize assignment of configured channels to cells of the CBSD | (Total bandwidth of configured channels assigned to cells / min (OBW of CBSD or number of configured prioritized channels)* 100 |
| Minimize Interference | Weighted | Minimize the use of channels with interference from RSSI measurements taken for a CBSD | ((Sum of Interference as a percentage per cell)/(Number of cells* 100)) / 100 |
| Limit Cell Bandwidth | Validator | Limit the Bandwidth of Cells of a CBSD based on configured bandwidth of each of the cells of a CBSD | Valid if bandwidth assigned per cell equals configured bandwidth per cell |
| Minimum Power | Validator | Invalidate authorized grant to cells combinations where a minimum power is not achieved | Valid if authorized grant assignment per cell meets or exceeds configured minimum power per cell. This value may be a RAN configuration for the cells converted to maxEirp (dBm/MHz) |
| Invalidate PAL and GAA on same Cell | Validator | Invalidate the use of PAL Authorized Grants aggregated with GAA Authorized Grants on the same cell of a CBSD | Valid if aggregated grants per cell does not include both GAA grants and PAL grants on the same cell |

These examples are illustrative, other profile elements can be created and used for profiles.

In one embodiment this may be a user defined and configured profile for a CBSD. In this embodiment the user may configure the CBSD with the highest priority being to maximize the number of channels assigned to the ells of the CBSD followed by maximizing the power of the authorized channels assigned to the cell and with the lowest priority the maximum IBW is reached with the bandwidth of Cell A and Cell B of 40 MHz contiguous channels.

All cell/channel combinations may be cached and a processor iterate over each combination, storing and updating the current maximum weight and the cells/channels combination for that weight.

In alternative embodiments additional optimizations can be applied.

Additional Criteria:
  5G NR (New Radio) application screening configuration for CBRS:
    G—represents the numerology for the available channels based on application screening.

Different services have different latency (delay) and bit rate (includes use rate at cell edge). For example, remote surgery requires less delay and very less user rate. But, at the same time Holographic Applications require less latency and high bit rate.

Based on application type that the users are commonly using, channel allocation apparatus will additionally configure bandwidth and numerology (sub-carrier spacing) for the band. Higher numerology in CBRS mid-band (eg: 30/60 KHz) leads to lesser delay and higher bandwidth for better bitrate.

Figure 8:
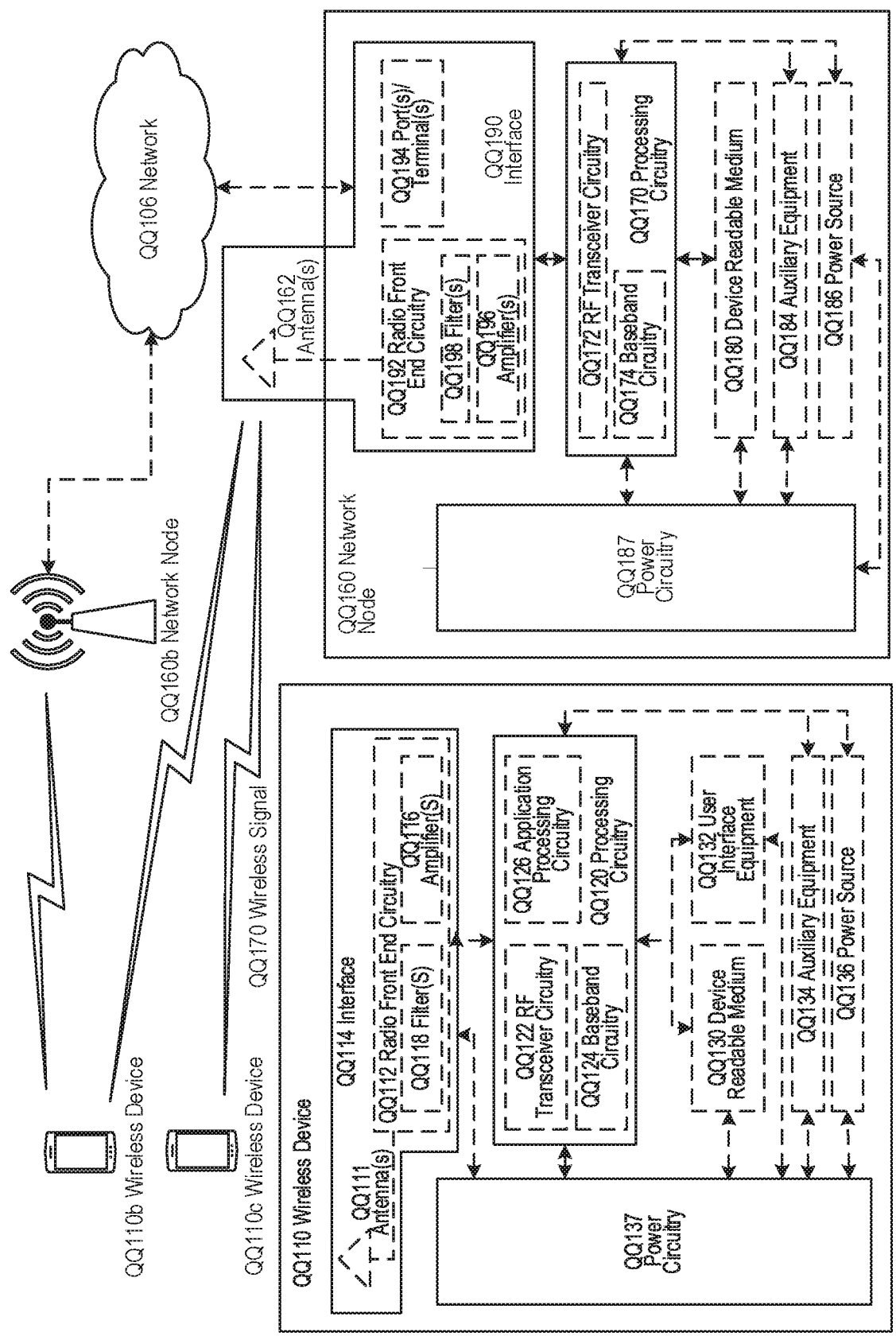
FIG. 8 shows an example of a wireless network in which the method and devices disclosed in this document may operate.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 8 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 9:
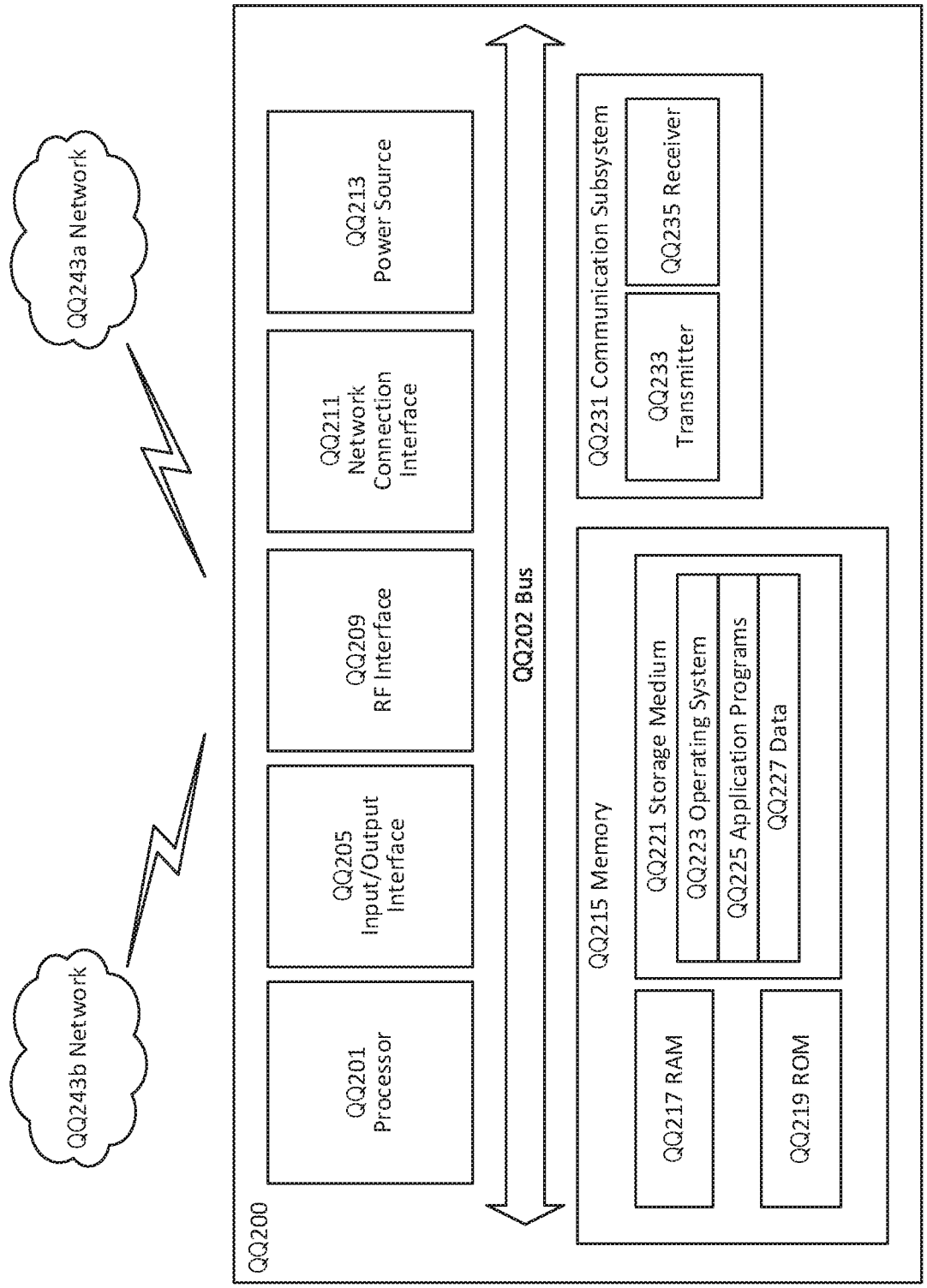
FIG. 9 illustrates one embodiment of a UE in accordance with various aspects described herein.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 9, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine alocation, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 10:
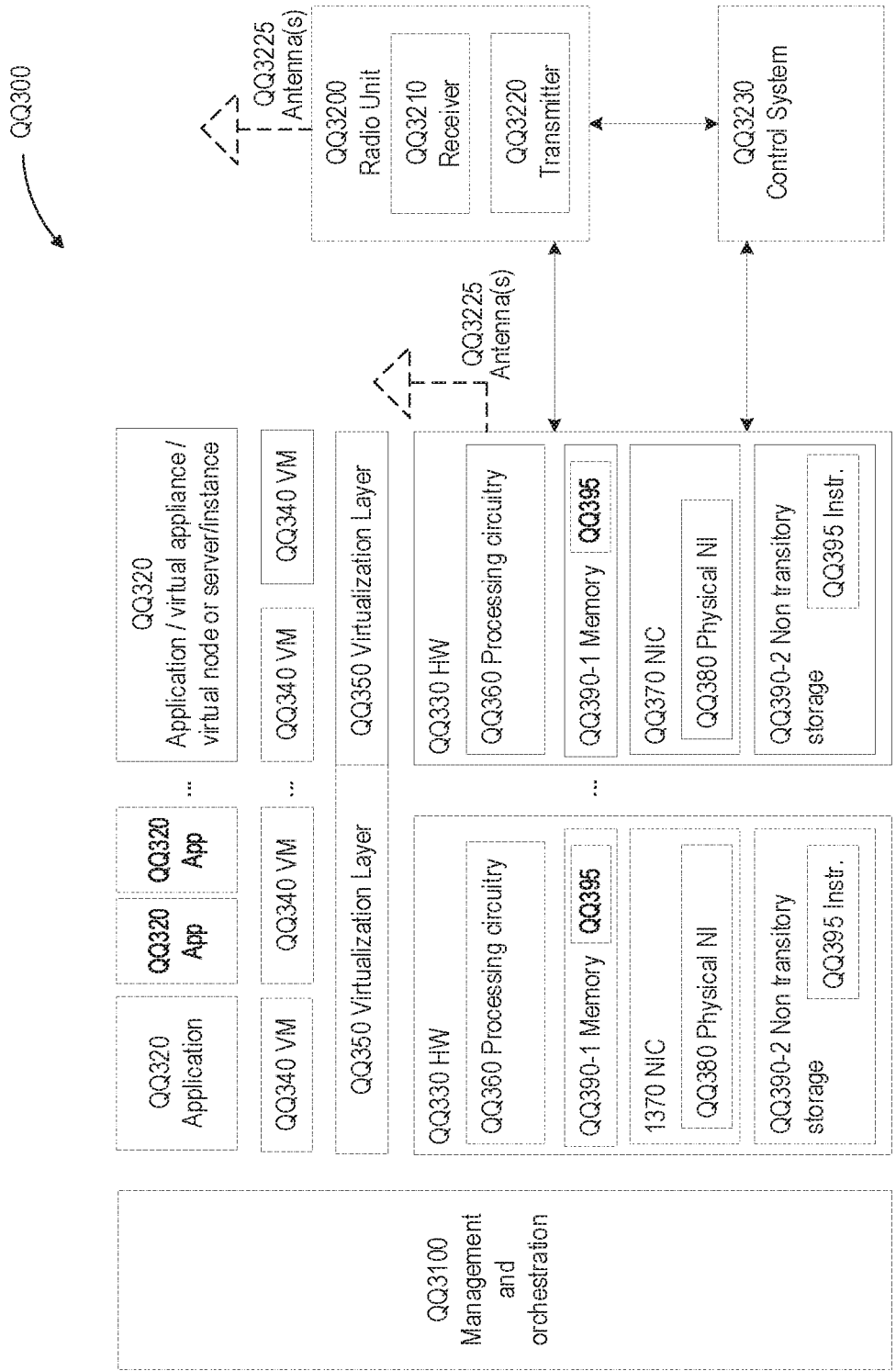
FIG. 10 is a schematic block diagram illustrating a virtualization environment in which methods and devices disclosed herein may be implemented.

FIG. 10 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 10, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g., such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 10.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 11:
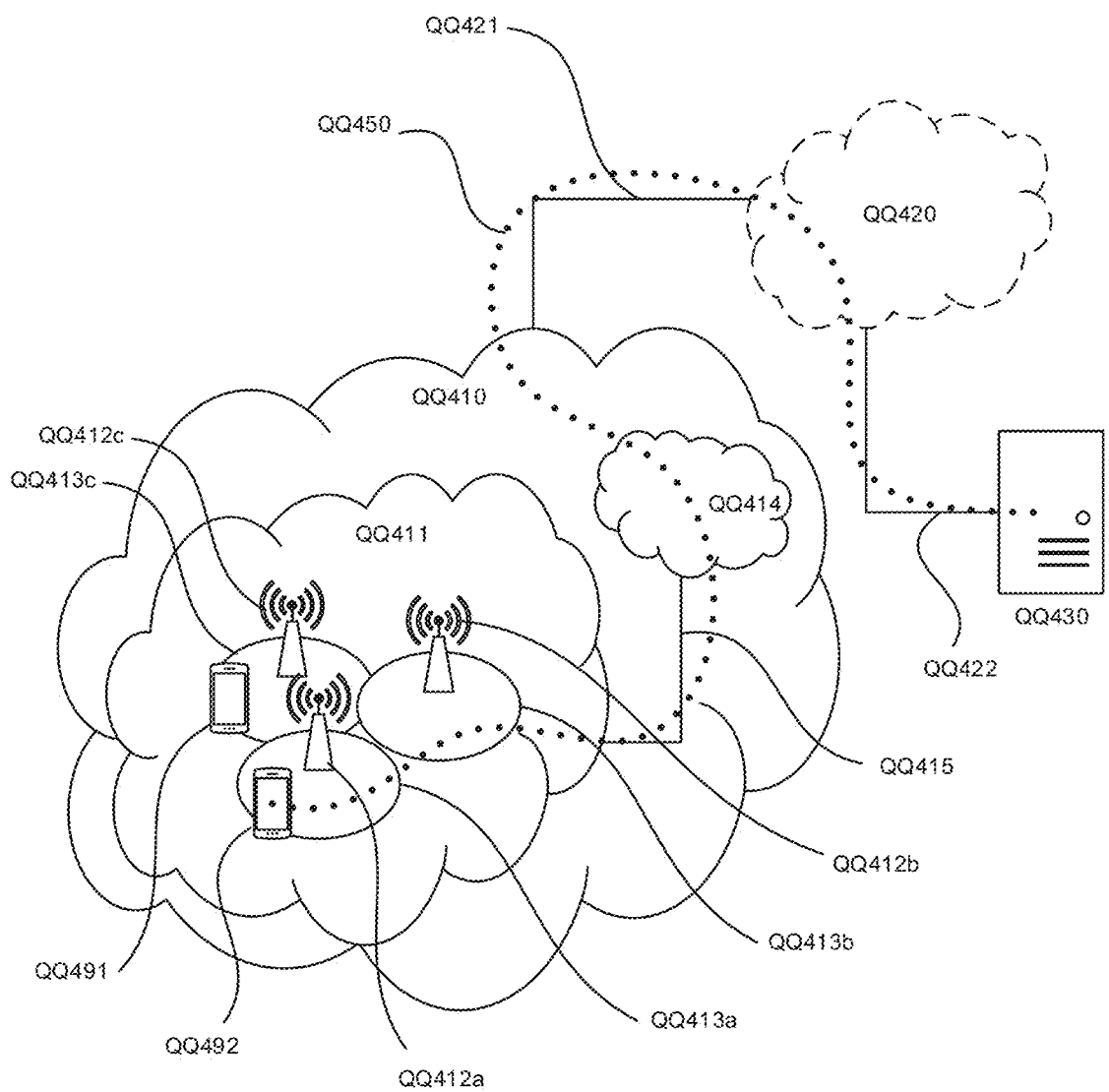
FIG. 11 and FIG. 12 illustrate one embodiment of a communication system in which methods and devices disclosed herein may be implemented.

With reference to FIG. 11, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 11 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 12. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 12) served by base station QQ520. Communication interface QQ526 may be configured to facilitate connection QQ560 to host computer QQ510. Connection QQ560 may be direct or it may pass through a core network (not shown in FIG. 12) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 12:
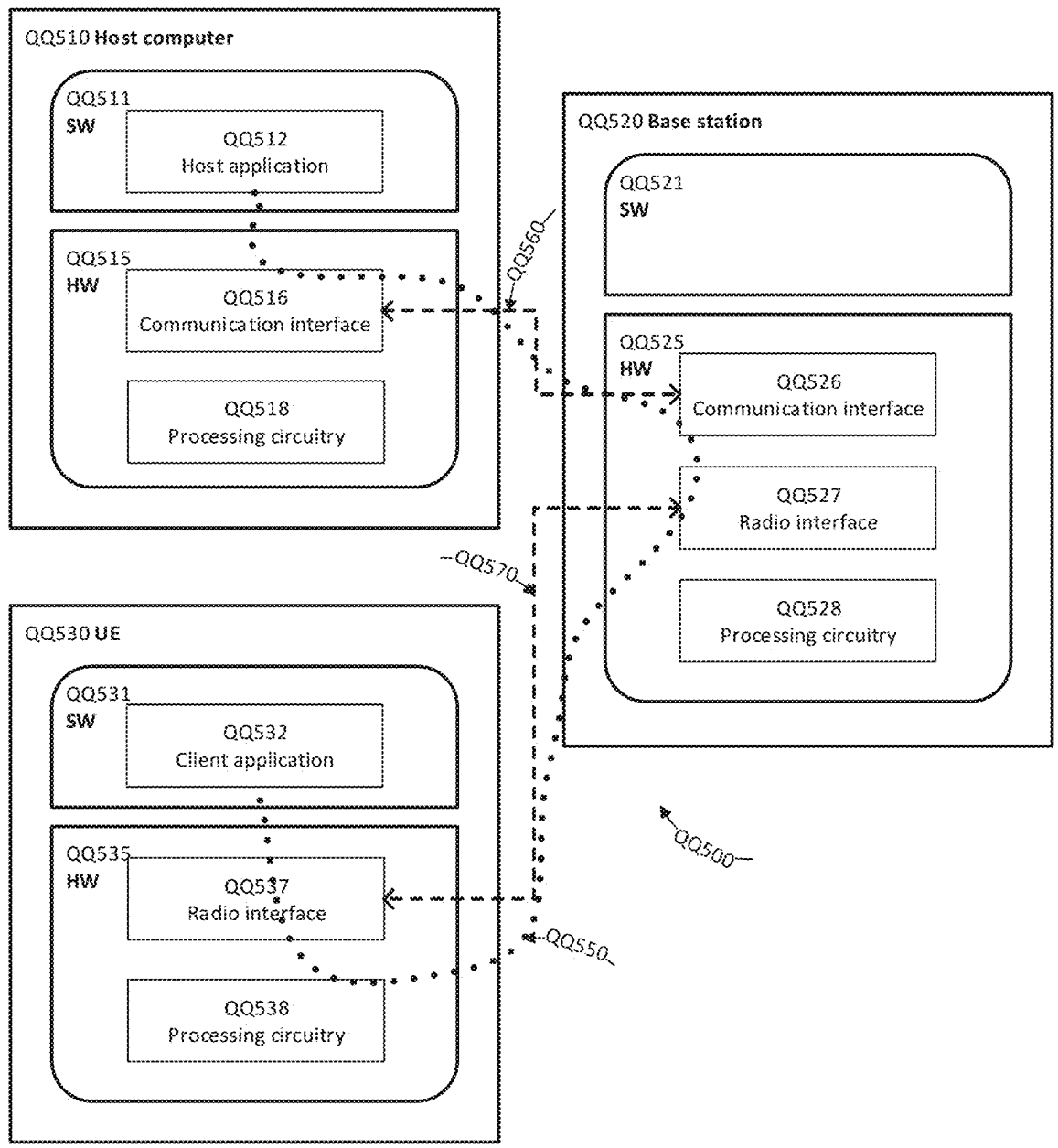

It is noted that host computer QQ510, base station QQ520 and UE QQ530 illustrated in FIG. 12 may be similar or identical to host computer QQ430, one of base stations QQ412a, QQ412b, QQ412c and one of UEs QQ491, QQ492 of Figure QQ4, respectively. This is to say, the inner workings of these entities may be as shown in FIG. 12 and independently, the surrounding network topology may be that of Figure QQ4.

In FIG. 12, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve coverage of the network, usage of radio channels temporarily authorized for being used by the wireless cellular network, throughput of the wireless cellular network while being authorized to use the radio channels controlled by (or licensed to, or normally used by) a second system and thereby provide benefits such as increased bandwidth for services in the cells (areas) covered by said radio channels, reduced congestion as more channels are available for providing services to UEs in the cells where the radio channels temporarily authorized for being used by the wireless cellular network are deployed.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 13:
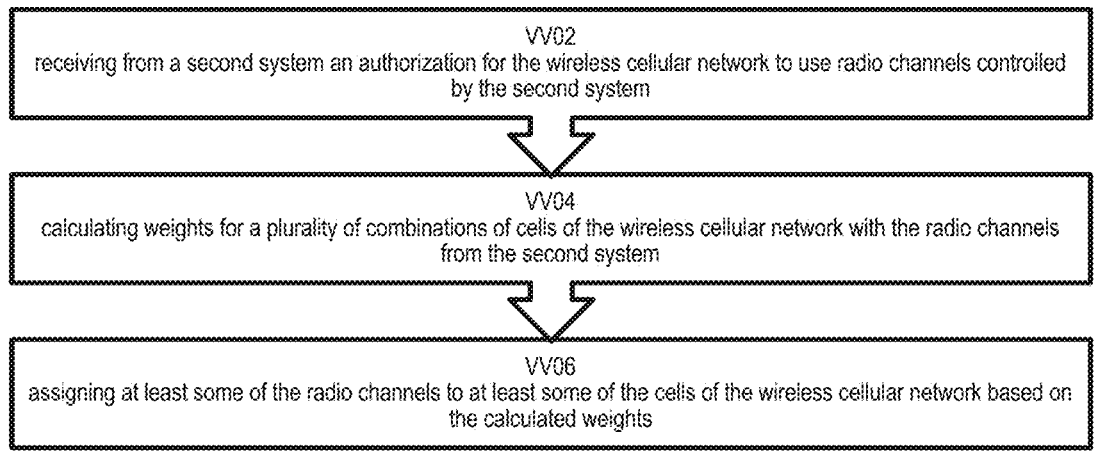
FIG. 13 illustrates a method for allocating radio channels for use in a wireless cellular network in accordance with embodiments described in this document.

FIG. 13 depicts a method for allocating radio channels for use in a wireless cellular network in accordance with particular embodiments, the method begins at step VV02 with receiving from a second system an authorization for the wireless cellular network to use radio channels controlled by the second system. The wireless cellular network may be a 3GPP wireless cellular communication network, for example 4G (also known as LTE) or 5G (also referred to as NR). The second system may be, for example, a Citizen's Broadband Radio Service (CBRS) or other system operating in part(s) of the spectrum not licensed to the wireless cellular network. In step VV04 the method comprises calculating weights for a plurality of combinations of cells of the wireless cellular network with the radio channels from the second system. In step VV06 the method comprises assigning at least some of the radio channels to at least some of the cells of the wireless cellular network based on the calculated weights. The method optimises distribution of radio channels by assigning the radio channels to the cells based on criteria that may be specified by the network operator. The criteria are used to calculate the weight of the channel(s)-to-cells combinations depending on the need or policy of the network operator.

Figure 14:
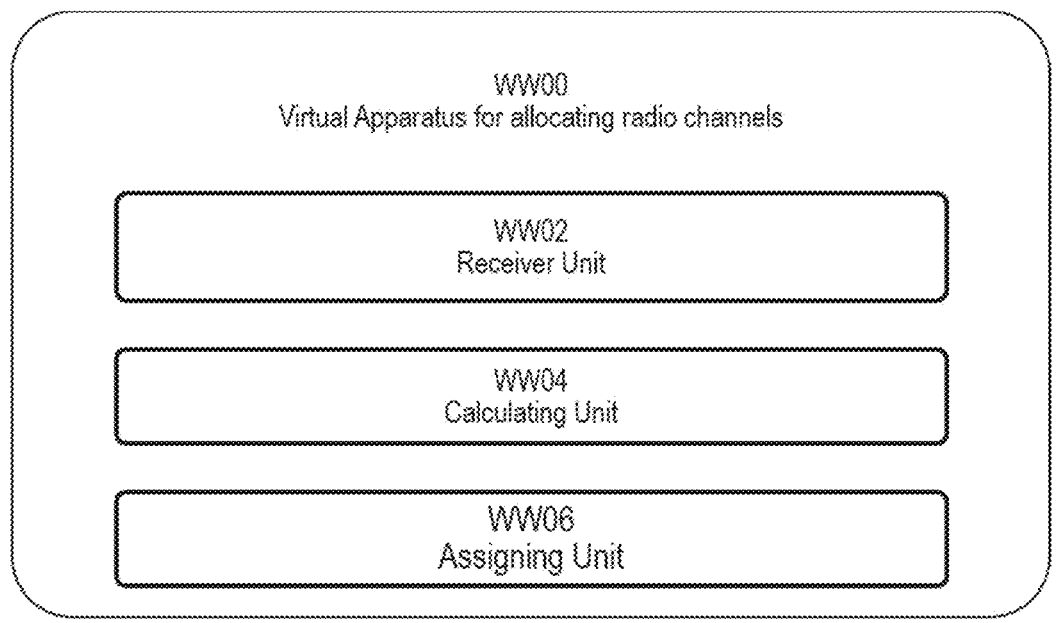
FIG. 14 illustrates a schematic block diagram of an apparatus for allocating radio channels for use in a wireless cellular network in accordance with embodiments described in this document.

FIG. 14 illustrates a schematic block diagram of an apparatus WW00 for allocating radio channels for use in a wireless cellular network, the apparatus is for use in a wireless (cellular) network (for example, the wireless network shown in FIG. QQ1). The apparatus may be implemented in a wireless device or network node (e.g., wireless device QQ110 or network node QQ160 shown in Figure QQ1). Apparatus WW00 is operable to carry out the example method described with reference to FIG. 13 and possibly any other processes or methods disclosed herein. It is also to be understood that the method of FIG. 13 is not necessarily carried out solely by apparatus WW00. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit WW02, calculating unit WW04, and assigning unit WW06, and any other suitable units of apparatus WW00 to perform corresponding functions according one or more embodiments of the present disclosure.

As illustrated in FIG. 14, apparatus WW00 includes a receiver unit WW02, a calculating unit WW04 and an assigning unit WW06, and the receiver unit WW02 is configured to receive from a second system an authorization for the wireless cellular network to use radio channels controlled by the second system. The second system may be, for example, a Citizen's Broadband Radio Service (CBRS) or another system operating in part(s) of the spectrum not licensed to a 3GPP wireless cellular network. The calculating unit WW04 is configured to calculate weights for a plurality of combinations of cells of the wireless cellular network with the radio channels from the second system. The assigning unit WW06 is configured to assign at least some of the radio channels to at least some of the cells of the wireless cellular network based on the calculated weights. The apparatus, when operating in accordance with the method illustrated in FIG. 13 is configured to optimise distribution of radio channels by assigning the radio channels to the cells based on criteria that may be specified by the network operator. The criteria are used to calculate the weight of the channel(s)-to-cells combinations depending on the need or policy of the network operator.

Figure 15:
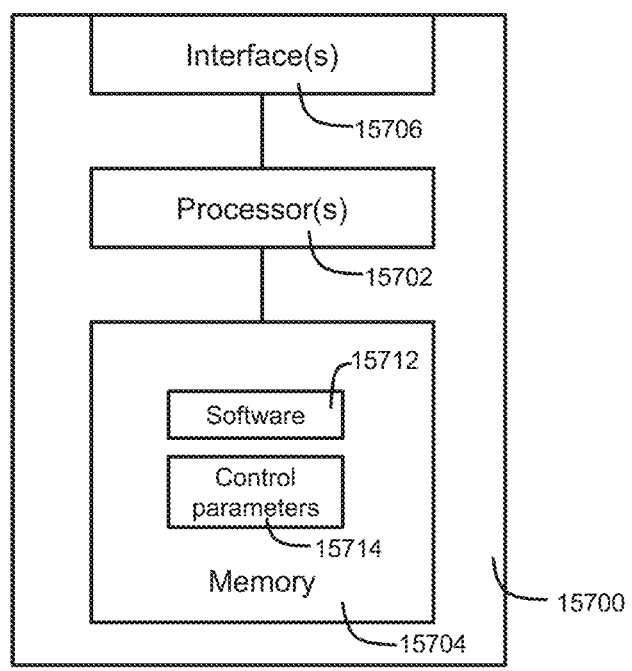
FIG. 15 illustrates a schematic block diagram of an apparatus for allocating radio channels for use in a wireless cellular network in accordance with embodiments described in this document.

In an alternative embodiment illustrated in FIG. 15 an apparatus for allocating radio channels for use in a wireless cellular network is disclosed. The apparatus 15700 comprises a processing circuitry, 15702, and a memory, 15704. The memory, 15704, contains instructions executable by the processing circuitry, 15702, such that the apparatus, 15700, is operative to receive, from a second system, an authorization for the wireless cellular network to use radio channels controlled by the second system, calculate weights for a plurality of combinations of cells of the wireless cellular network with the radio channels from the second system; and assign at least some of the radio channels to at least some of the cells of the wireless cellular network based on the calculated weights.

The apparatus, 15700, in its embodiments is operative to carry out the embodiments of the method disclosed in this document.

The apparatus, 15700, may include processing circuitry (one or more than processor) 15702 coupled to the interface(s) 15706, and to the memory 15704. By way of example, the interface(s) 15706, the processor(s) 15702, and the memory 15704 could be connected in series as illustrated in FIG. 15. Alternatively, these components 15702, 15704 and 15706 may be coupled to an internal bus system of the apparatus, 15700. The memory 15704 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory, 15704, may include software, 15712, and/or control parameters, 15714. The memory, 15704, may include suitably configured program code to be executed by the processor(s), 15702, so as to implement the above-described method as explained in connection with Figure W and embodiments described in this document.

The interface, 15706, is for connecting the apparatus, 15700, to other elements of the network operating Citizens Broadband Radio Service (CBRS).

It is to be understood that the structures as illustrated in FIG. 15 are merely schematic and that the apparatus, 15700, may actually include further components which, for the sake of clarity, have not been illustrated, e.g., further interfaces or processors. Also, it is to be understood that the memory 15704 may include further program code for implementing other and/or known functionalities.

According to some embodiments, also a computer program may be provided for implementing functionalities of the apparatus 15700, e.g., in the form of a physical medium storing the program code and/or other data to be stored in the memory 15704, or by making the program code available for download or by streaming.

It is also to be understood that the apparatus 15700 may be provided as a virtual apparatus 15700. In one embodiment, the apparatus 15700 may be provided in distributed resources, such as cloud resources. When provided as a virtual apparatus, it will be appreciated that the memory 15704, processing circuitry 15702, and interface 15706 may be provided as functional elements. The functional elements may be distributed in a logical network and not necessarily be directly physically connected. It is also to be understood that the apparatus 15700 may be provided as a single-node device, or as a multi-node system.

Figure 2A:
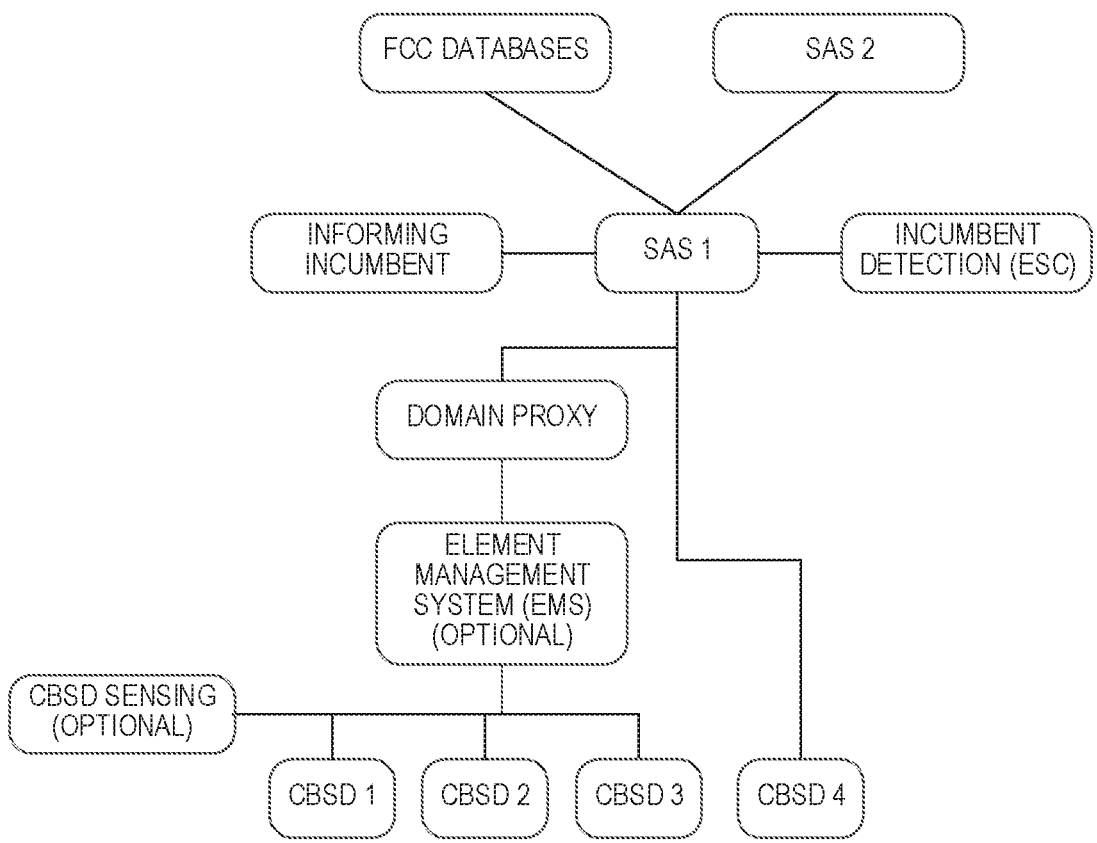
FIG. 2A illustrates Winnforum reference architecture for CBRS deployments.
Figure 2B:
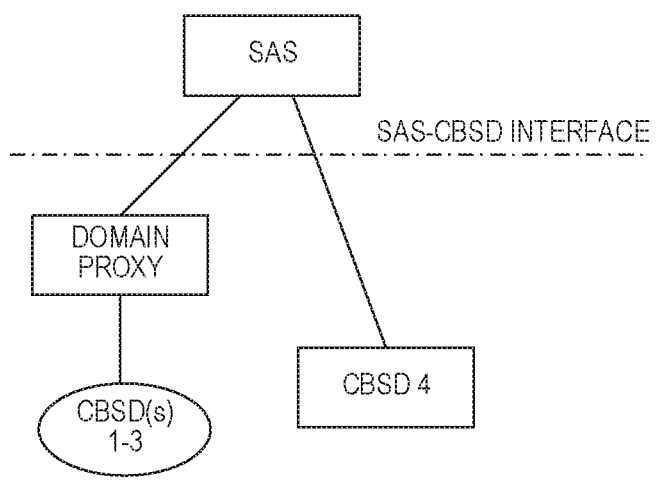
FIG. 2B illustrates interface for communication between a SAS and CBSD devices or Domain Proxies (DP)
Figure 16:
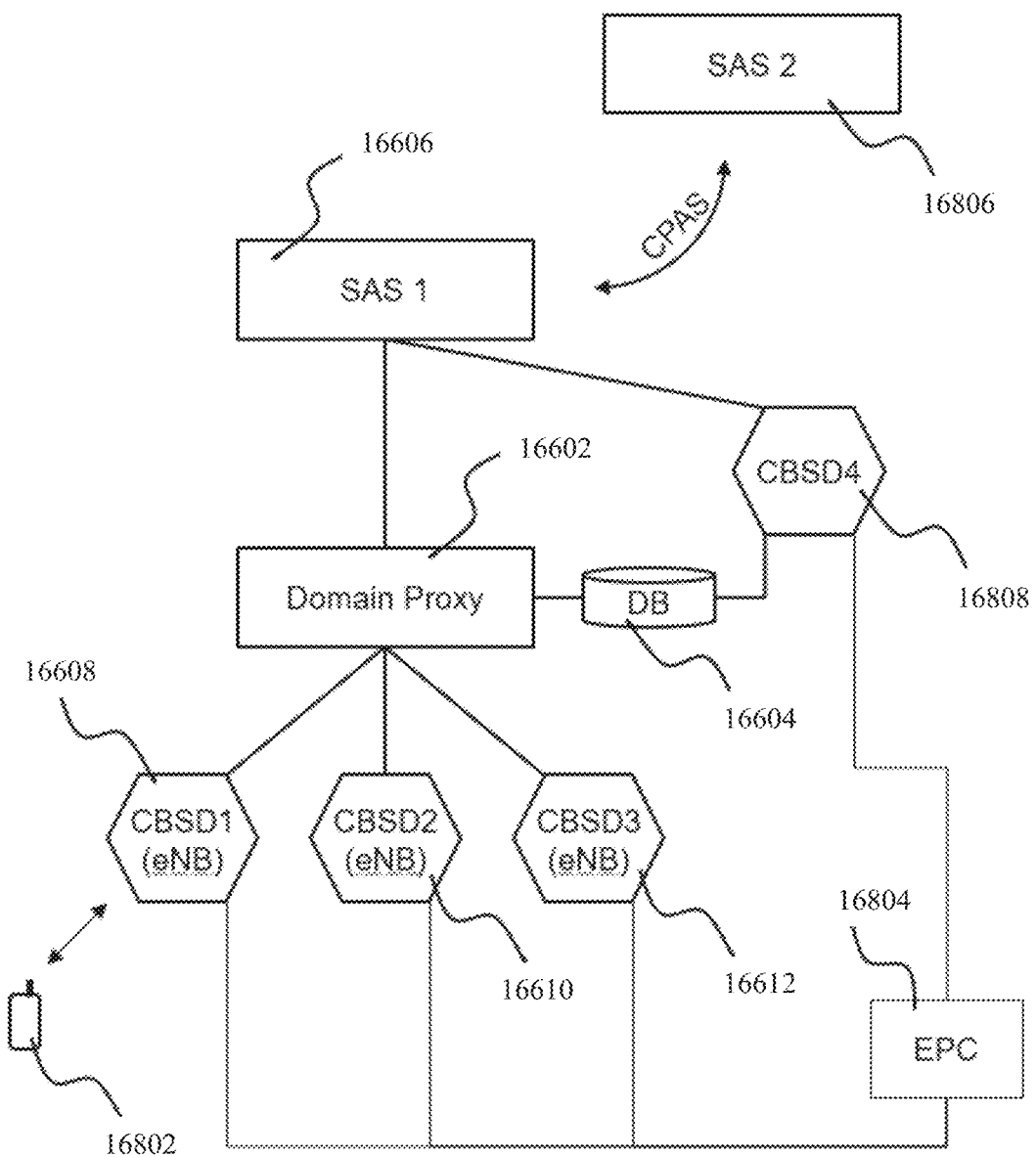
FIG. 16 illustrates more detailed architecture of a CBRS system.
Figure 17:
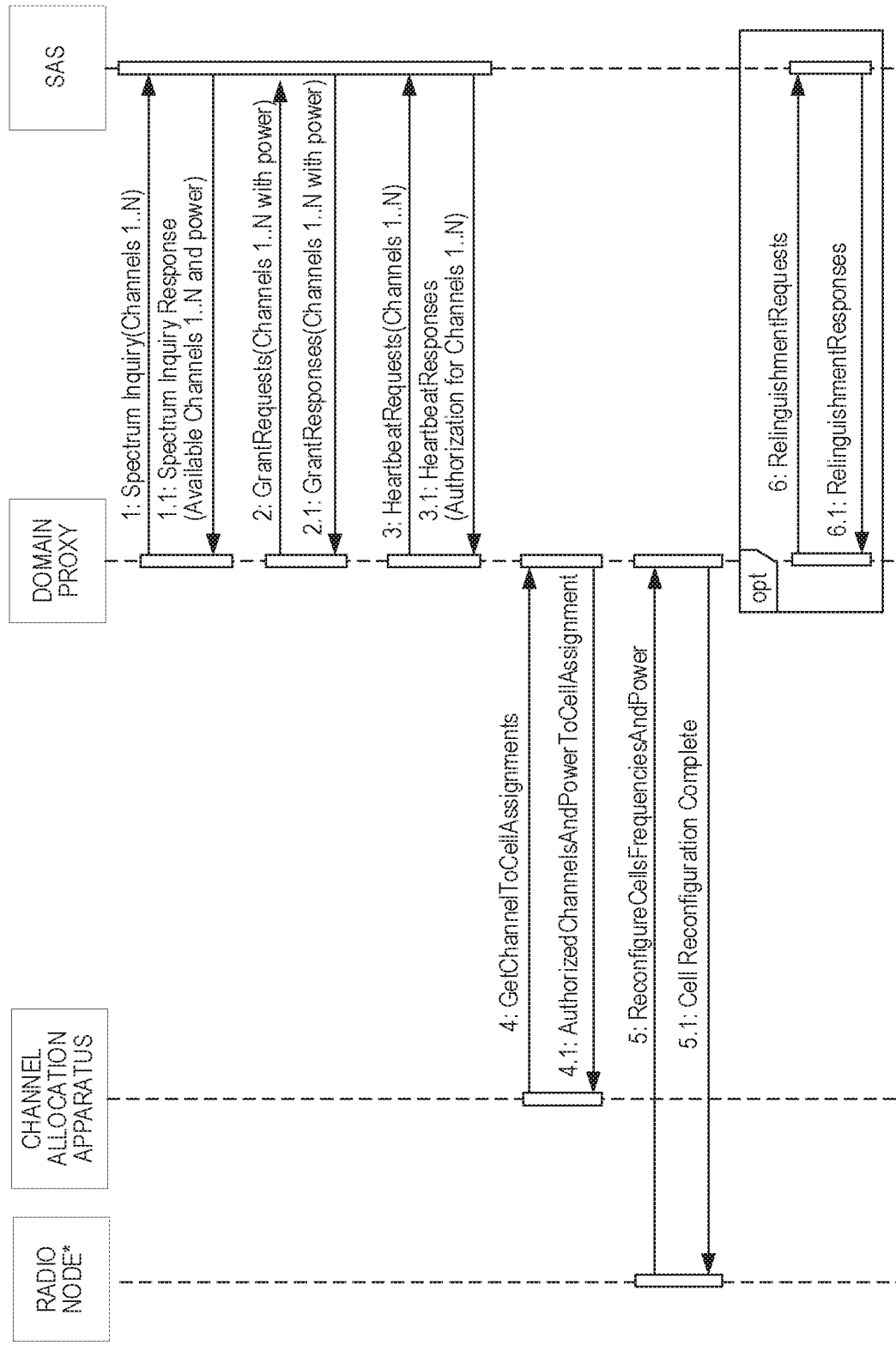
FIG. 17 illustrates a message flow in an embodiment of a method for allocation of channels to a cell.

FIGS. 16 and 17 below illustrate one embodiment of a network operating in accordance with embodiments of the method disclosed in this document. FIG. 16 illustrates additional components of a wireless mobile communications network compared with what is illustrated in FIGS. 2A and 2B to better illustrate the context in which the present solution operates. Network operators may deploy 4G and 5G wireless networks using the CBRS band. For this to work the SAS, 16606 and 16806, must authorise their associated CBSDs 16608-16612 and 16808. For clarity and brevity FIG. 16 only shows CBSDs associated with SAS 1, 16606. Once the CBSDs are authorised they will use the CBRS band, or part of it for which their grants are authorised, for providing service to user equipment 16802. In this embodiment the CBSDs 16608-16612 may be the eNodeBs that normally operate in LTE bands and CBSD 4, 16808, may be an access point providing access only in the CBRS band. The CBSDs 16608-16612 and 16808 are connected to the evolved packet core (EPC) network, 16804. Cooperation between SAS 1 and SAS 2 in the CPAS process is also illustrated. The same considerations are applicable to 5G networks deployments.

The Channel Allocation Apparatus may be implemented within a radio node (CBSD or baseband node), within a Domain Proxy for CBRS or for other technologies in a separate system.

FIG. 17 illustrates message flow in an embodiment of a method for allocation of channels and setting maximum power per channel. Tables 4.1 and 4.2 below explains the details of the message flow in FIG. 17. The sequence diagram in FIG. 17 presents where a Domain Proxy is involved representing the CBSDs of a Radio Node, and shows invoking the apparatus for channel assignment to cells.

TABLE 4.1

| | |
|---|---|
| Radio Node* | CBSD or Radio Nodes serving multiple CBSD devices. |
| Channel Allocation Apparatus | Inventive apparatus that allocates the channels and channel power based on allocated channels, and optionally, power per channel, radio capabilities, transmission state of cells, profile for radio and based on execution of the method disclosed in this document. |
| Domain Proxy | An entity engaging in communications with the SAS on behalf of multiple CBSDs [1] |
| SAS | Spectrum Access System. An external channel/power authorization system. [1] |

TABLE 4.2

| | |
|---|---|
| 1 | The Domain Proxy requests via Spectrum Inquiry the available channels from the SAS on behalf of the CBSD. Note: channels 1..N may be sequential channels or a subset of available channels desired for the CBSD and based on the CBSD capabilities. |
| 1.1 | The SAS responds with the available channels for that CBSD and maxEirp (dBm/MHz) per channel |
| 2 | Based on available channels from the SAS, the Domain Proxy requests grants for the desired channels and power (below or equal to maxEirp for those channels in Spectrum Inquiry Response). Optionally power renegotiation may be required where the SAS reduces the maxEirp in the GrantResponse. |
| 2.1 | SAS responds successfully to the GrantRequests. |
| 3 | For each granted channel, Domain Proxy sends a HeartbeatRequest to the SAS |
| 3.1 | SAS responds with authorization to transmit on those channels based on granted power. |
| 4 | The "Channel Allocation Apparatus" is invoked with the defined criteria and, prioritization for the CBSD, the capabilities of the CBSD and authorized channels/maxEirp per channel |
| 4.1 | The result of the best assignment of authorized channel(s)/maxEirp per channel and based on the input criteria is returned. |
| 5 | Request for cells are reconfiguration with frequency, channel bandwidth, and power based on the authorized grants(s) assigned to the cells. |
| 5.1 | The radio node responds with successful reconfiguration of cells. |
| 6 | Optionally if additional authorized grants have not been assigned to cells (due to capabilities of the CBSD or configuration for the CBSD) then the DomainProxy relinquishes these unused authorized grants. |
| 6.1 | The SAS responds with successful relinquishment of unused grants. |

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

REFERENCES

1. "Signaling Protocols and Procedures for Citizens Broadband Radio Service (CBRS): Spectrum Access System (SAS)—Citizens Broadband Radio Service Device (CBSD) Interface Technical Specification", published by WinnForum, document WINNF-TS-0016 Version V1.2.2
2. "Spectrum Sharing Committee Policy and Procedure Coordinated Periodic Activities Policy", published by WinnForum, document WINNF-SSC-0008 Version 1.1.0
3. 3GPP TS 36.101 version 15.3.0 Release 15

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).
    CBSD Citizens Broadband Radio Service Device
    CBRS Citizens Broadband Radio Service
    SAS Spectrum Access System
    IBW Instantaneous BandWidth
    OBW Occupied Bandwidth
    CA Carrier Aggregation
    RAN Radio Access Network
    1×RTT CDMA2000 1× Radio Transmission Technology
    3GPP 3rd Generation Partnership Project
    5G 5th Generation
    ABS Almost Blank Subframe
    ARQ Automatic Repeat Request
    AWGN Additive White Gaussian Noise
    BCCH Broadcast Control Channel
    BCH Broadcast Channel
    CA Carrier Aggregation
    CC Carrier Component
    CCCH SDU Common Control Channel SDU
    CDMA Code Division Multiplexing Access
    CGI Cell Global Identifier
    CIR Channel Impulse Response
    CP Cyclic Prefix
    CPICH Common Pilot Channel
    CPICH Ec/No CPICH Received energy per chip divided by the power density in the band
    CQI Channel Quality information
    C-RNTI Cell RNTI
    CSI Channel State Information
    DCCH Dedicated Control Channel
    DL Downlink
    DM Demodulation
    DMRS Demodulation Reference Signal
    DRX Discontinuous Reception
    DTX Discontinuous Transmission
    DTCH Dedicated Traffic Channel
    DUT Device Under Test
    E-CID Enhanced Cell-ID (positioning method)
    E-SMLC Evolved-Serving Mobile Location Centre
    ECGI Evolved CGI
    eNB E-UTRAN NodeB
    ePDCCH enhanced Physical Downlink Control Channel
    E-SMLC evolved Serving Mobile Location Center
    E-UTRA Evolved UTRA
    E-UTRAN Evolved UTRAN
    FDD Frequency Division Duplex
    GAA General Authorized Access
    GERAN GSM EDGE Radio Access Network
    gNB Base station in NR
    GNSS Global Navigation Satellite System
    GSM Global System for Mobile communication
    HARQ Hybrid Automatic Repeat Request
    HO Handover
    HSPA High Speed Packet Access
    HRPD High Rate Packet Data
    LOS Line of Sight
    LPP LTE Positioning Protocol
    LTE Long-Term Evolution
    MAC Medium Access Control
    MBMS Multimedia Broadcast Multicast Services
    MBSFN Multimedia Broadcast multicast service Single Frequency Network
    MDT Minimization of Drive Tests
    MIB Master Information Block
    MME Mobility Management Entity
    MSC Mobile Switching Center
    NPDCCH Narrowband Physical Downlink Control Channel
    NR New Radio
    OFDM Orthogonal Frequency Division Multiplexing
    OFDMA Orthogonal Frequency Division Multiple Access
    OSS Operations Support System
    OTDOA Observed Time Difference of Arrival
    O&M Operation and Maintenance
    PAL Priority Access License
    PBCH Physical Broadcast Channel
    P-CCPCH Primary Common Control Physical Channel
    PCell Primary Cell
    PCFICH Physical Control Format Indicator Channel
    PDCCH Physical Downlink Control Channel
    PDCP Packet Data Convergence Protocol
    PDP Profile Delay Profile
    PDSCH Physical Downlink Shared Channel
    PGW Packet Gateway
    PHICH Physical Hybrid-ARO Indicator Channel
    PLMN Public Land Mobile Network
    PMI Precoder Matrix Indicator
    PRACH Physical Random Access Channel
    PRS Positioning Reference Signal
    PSS Primary Synchronization Signal
    PUCCH Physical Uplink Control Channel
    PUSCH Physical Uplink Shared Channel
    RACH Random Access Channel
    QAM Quadrature Amplitude Modulation
    RAN Radio Access Network
    RAT Radio Access Technology RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method for allocating radio channels for use in a wireless cellular network, implemented by a network node, the method comprising:
   receiving, from a Spectrum Access System (SAS), an authorization for the wireless cellular network to use radio channels;
   after receiving the authorization, calculating weights for a plurality of combinations of cells of the wireless cellular network with the radio channels from the SAS; and
   assigning at least some of the radio channels to at least some of the cells of the wireless cellular network based on the calculated weights.

2. The method according to claim 1, wherein the radio channels identified in the authorization are not required by the SAS.

3. The method according to claim 1, wherein the radio channels identified in the authorization are licensed to the SAS.

4. The method according to claim 1, wherein the radio channels identified in the authorization are controlled by the SAS.

5. The method according to claim 1, wherein the authorization may be for a specified time and may be revoked by the SAS.

6. The method according to claim 1, wherein the authorization may be revoked by the SAS.

7. The method according to claim 1, wherein the authorization may be received in response to a request from the wireless cellular network.

8. The method according to claim 1, wherein calculating weights for the plurality of combinations is based on priority value assigned to individual channel units.

9. The method according to claim 8 comprising prioritizing the use of non-Fixed Satellite System channel units.

10. The method according to claim 8, wherein calculating weights for the plurality of combinations is based on priority value assigned to individual channels units as well as percentage of potential maximum power available per channel unit.

11. The method according to claim 1, wherein the weights are calculated for a plurality of combinations of allocation of channel units with a defined maximum number of channel units per cell.

12. The method according to claim 1, wherein assigning at least some of the radio channels to at least some of the cells of the wireless cellular network based on the calculated weights comprises assigning channel units to cells using the combination of cells and channels having the highest weight.

13. The method according to claim 1 comprising filtering out overlapping channel unit allocations to cells.

14. The method according to claim 1, further comprising determining a priority level, based on the calculated weights, of the plurality of combinations of cells of the wireless cellular network, wherein the priority level is associated with a capability of the SAS.

15. A network node for allocating radio channels for use in a wireless cellular network, the network node comprising a processing circuitry and a memory, the memory containing instructions executable by the processing circuitry such that network node is configured to:
   receive, from a Spectrum Access System (SAS), an authorization for the wireless cellular network to use radio channels;
   after receiving the authorization, calculate weights for a plurality of combinations of cells of the wireless cellular network with the radio channels from the SAS; and
   assign at least some of the radio channels to at least some of the cells of the wireless cellular network based on the calculated weights.

16. The network node according to claim 15, wherein the radio channels identified in the authorization are not required by the SAS.

17. The network node according to claim 15, wherein the radio channels identified in the authorization are licensed to the SAS.

18. The network node according to claim 15, wherein the radio channels identified in the authorization are controlled by the SAS.

19. The network node according to claim 15, wherein to calculate weights for the plurality of combinations the network node is operative to base the calculation on priority value assigned to individual channel units.

20. The network node according to claim 19, wherein the network node is operative to prioritize the use of non-Fixed Satellite System channel units.

21. The network node according to claim 19, wherein the network node is operative to calculate weights for the plurality of combinations based on priority value assigned to individual channels units as well as percentage of potential maximum power available per channel unit.

22. The network node according to claim 15 operative to calculate the weights for a plurality of combinations of allocation of channel units with a defined maximum number of channel units per cell.

23. The network node according to claim 15, wherein in assigning at least some of the radio channels to at least some of the cells of the wireless cellular network based on the calculated weights the network node is operative to assign channel units to cells using combination of cells and channels having the highest weight.

24. The network node according to claim 15 operative to filter out overlapping channel unit allocations to cells.

25. A non-transitory computer readable medium storing a computer program product comprising instructions which, when executed on at least one processor of a programmable network node, cause the at least one processor to:
  receive, from a Spectrum Access System (SAS), an authorization for a wireless cellular network to use radio channels;
  after receiving the authorization, calculate weights for a plurality of combinations of cells of the wireless cellular network with the radio channels from the SAS; and
  assign at least some of the radio channels to at least some of the cells of the wireless cellular network based on the calculated weights.

* * * * *